United States Patent
Takahashi

(10) Patent No.: US 10,367,432 B2
(45) Date of Patent: Jul. 30, 2019

(54) PIEZOELECTRIC DRIVE DEVICE, DRIVE METHOD OF PIEZOELECTRIC DRIVE DEVICE, ROBOT, ELECTRONIC COMPONENT TRANSPORT APPARATUS, PRINTER, AND PROJECTOR

(71) Applicant: Seiko Epson Corporation, Tokyo (JP)

(72) Inventor: Tomoaki Takahashi, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/938,443

(22) Filed: Mar. 28, 2018

(65) Prior Publication Data
US 2018/0287515 A1  Oct. 4, 2018

(30) Foreign Application Priority Data

Mar. 31, 2017  (JP) .................................. 2017-070931

(51) Int. Cl.
| | |
|---|---|
| *H02K 33/00* | (2006.01) |
| *H02N 2/14* | (2006.01) |
| *G03B 21/14* | (2006.01) |
| *B06B 1/06* | (2006.01) |
| *H02N 2/00* | (2006.01) |

(Continued)

(52) U.S. Cl.
CPC ............. *H02N 2/14* (2013.01); *B06B 1/0603* (2013.01); *G03B 21/142* (2013.01); *H02N 2/004* (2013.01); *H02N 2/006* (2013.01); *H02N 2/0055* (2013.01); *H02N 2/026* (2013.01); *H02N 2/06* (2013.01); *H02N 2/103* (2013.01); *B06B 1/0207* (2013.01); *B06B 2201/55* (2013.01); *B25J 9/12* (2013.01); *B41J 2/04581* (2013.01); *B41J 2/14201* (2013.01); *G03B 21/006* (2013.01); *G03B 33/12* (2013.01); *Y10S 901/23* (2013.01)

(58) Field of Classification Search
CPC ..... H02N 2/14; B06B 2201/55; G03B 21/142
See application file for complete search history.

(56) References Cited

U.S. PATENT DOCUMENTS

| | | | |
|---|---|---|---|
| 2016/0241165 | A1 | 8/2016 | Miyazawa |
| 2017/0171392 | A1* | 6/2017 | Yuan ....................... H04M 3/56 |

FOREIGN PATENT DOCUMENTS

| | | |
|---|---|---|
| JP | 03-022872 A | 1/1991 |
| JP | 2010-063228 A | 3/2010 |
| JP | 2016-152705 A | 8/2016 |

* cited by examiner

*Primary Examiner* — Karen Masih
(74) *Attorney, Agent, or Firm* — Harness, Dickey & Pierce, P.L.C.

(57) ABSTRACT

A piezoelectric drive device includes piezoelectric vibration modules that each include a vibration portion and a transmission unit abutting a driven portion and transmitting longitudinal vibration in an alignment direction of the vibration portion with the driven portion and bending vibration which is a composite of the longitudinal vibration and lateral vibration of the vibration portion intersecting the alignment direction to the driven portion and a controller controlling the modules. The controller controls the modules in a first drive mode wherein the transmission portions of all the modules are driven to perform the bending vibration in a first direction and a second drive mode wherein the transmission portions of some of the modules are driven to perform the bending vibration in the first direction and the transmission portions of other modules are driven to perform the longitudinal or bending vibrations in a second direction opposite the first direction.

20 Claims, 19 Drawing Sheets

(51) Int. Cl.
  *H02N 2/02* (2006.01)
  *H02N 2/06* (2006.01)
  *H02N 2/10* (2006.01)
  *B06B 1/02* (2006.01)
  *G03B 33/12* (2006.01)
  *B41J 2/045* (2006.01)
  *B25J 9/12* (2006.01)
  *B41J 2/14* (2006.01)
  *G03B 21/00* (2006.01)

PIEZOELECTRIC DRIVE DEVICE, DRIVE METHOD OF PIEZOELECTRIC DRIVE DEVICE, ROBOT, ELECTRONIC COMPONENT TRANSPORT APPARATUS, PRINTER, AND PROJECTOR

BACKGROUND

1. Technical Field

The present invention relates to a piezoelectric drive device, a drive method of the piezoelectric drive device, a robot, an electronic component transport apparatus, a printer, and a projector.

2. Related Art

An ultrasonic motor disclosed in JP-A-2010-63228 includes a first shaft, a first vibrator (piezoelectric element) for rotating the first shaft, a second shaft connected to the first shaft, a second vibrator (piezoelectric element) for rotating the second shaft, and an output shaft connected to the first shaft and the second shaft. The ultrasonic motor is configured such that an angular velocity of the first shaft can be controlled by the first vibrator, the angular velocity of the second shaft can be controlled by the second vibrator, and the angular velocity of the output shaft can be adjusted by independently changing the angular velocities of the first shaft and the second shaft.

However, in the ultrasonic motor disclosed in JP-A-2010-63228, the first shaft and the second shaft need to be provided in order to change the angular velocity of the output shaft and thus, an apparatus becomes complicated and large.

SUMMARY

An advantage of some aspects of the invention is to provide a piezoelectric drive device which is simple in a device configuration and can be miniaturized, a drive method of the piezoelectric drive device, and a robot, an electronic component transport apparatus, a printer, and a projector.

The advantage described above can be achieved by the following configurations.

A piezoelectric drive device according to an aspect of the invention includes a plurality of piezoelectric vibration modules each of which including a vibration portion and a transmission portion which abuts on a driven portion and transmits longitudinal vibration in an alignment direction in which the vibration portion is aligned with the driven portion and bending vibration which is a composite vibration of the longitudinal vibration and lateral vibration of the vibration portion in a direction intersecting the alignment direction to the driven portion, and the piezoelectric drive device has a first drive mode in which the transmission portions of the plurality of piezoelectric vibration modules perform the bending vibration in a first direction, and a second drive mode in which the transmission portions of some of the piezoelectric vibration modules perform the bending vibration in the first direction and the transmission portions of others of the piezoelectric vibration modules perform the longitudinal vibration or the bending vibration in a second direction opposite to the first direction.

According to such a configuration, it is possible to change a moving speed of the driven portion by switching between the first drive mode and the second drive mode and thus, the piezoelectric drive device has high operability (high convenience and easy to use). In addition, all the piezoelectric vibration modules abut on one driven portion and thus, a device configuration can be simplified and miniaturization can be achieved.

In the piezoelectric drive device according to the aspect of the invention, it is preferable that the second drive mode includes a third drive mode in which the transmission portions of some of the piezoelectric vibration modules perform the bending vibration in the first direction, the transmission portions of others of the piezoelectric vibration modules perform the bending vibration in the second direction, and the number of the piezoelectric vibration modules in which the transmission portions perform the bending vibration in the first direction is greater than the number of the piezoelectric vibration modules in which the transmission portions perform the bending vibration in the second direction.

With this configuration, the second drive mode can be realized by a simpler method.

In the piezoelectric drive device according to the aspect of the invention, it is preferable that the second drive mode includes a fourth drive mode in which the transmission portions of some of the piezoelectric vibration modules perform the bending vibration in the first direction, the transmission portions of some of the piezoelectric vibration modules perform the bending vibration in the second direction, the transmission portions of others of the piezoelectric vibration modules perform the longitudinal vibration, and the number of the piezoelectric vibration modules in which the transmission portions perform the bending vibration in the first direction is greater than the number of the piezoelectric vibration modules in which the transmission portions perform the bending vibration in the second direction.

With this configuration, the second drive mode can be realized by a simpler method.

In the piezoelectric drive device according to the aspect of the invention, it is preferable that the second drive mode includes a fifth drive mode in which the transmission portions of some of the piezoelectric vibration modules perform the bending vibration in the first direction and the transmission portions of others of the piezoelectric vibration modules perform the longitudinal vibration.

With this configuration, the second drive mode can be realized by a simpler method.

In the piezoelectric drive device according to the aspect of the invention, it is preferable that the second drive mode includes a sixth drive mode in which the transmission portions of some of the piezoelectric vibration modules perform the bending vibration in the first direction, the transmission portions of others of the piezoelectric vibration modules perform the longitudinal vibration, and the number of the piezoelectric vibration modules in which the transmission portions perform the bending vibration in the first direction is greater than the number of those at the fifth drive mode.

With this configuration, it is possible to obtain two second drive modes in which moving speeds of the driven portions are different from each other.

In the piezoelectric drive device according to the aspect of the invention, it is preferable to include a seventh drive mode in which movement of the driven portions is allowed by causing the transmission portions of the plurality of piezoelectric vibration modules to perform the longitudinal vibration.

With this configuration, for example, the operator can manually (with his/her own hand) operate the driven portion and usability of the piezoelectric drive device is further improved.

A drive method of a piezoelectric drive device according to another aspect of the invention is a drive method of a piezoelectric drive device which includes a plurality of piezoelectric vibration modules each of which including a vibration portion and a transmission portion which abuts on a driven portion and transmits longitudinal vibration in an alignment direction in which the vibration portion is aligned with the driven portion and bending vibration which is a composite vibration of the longitudinal vibration and lateral vibration of the vibration portion in a direction intersecting the alignment direction to the driven portion, and the drive method including setting a first drive mode in which the transmission portions of the plurality of piezoelectric vibration modules are caused to perform the bending vibration in a first direction and a second drive mode in which the transmission portions of some of the piezoelectric vibration modules are caused to perform the bending vibration in the first direction and the transmission portions of others of the piezoelectric vibration modules are caused to perform the longitudinal vibration or the bending vibration in a second direction opposite to the first direction and selecting and executing one of the first drive mode and the second drive mode.

According to such a drive method, it is possible to change a moving speed of the driven portion by switching between the first drive mode and the second drive mode and thus, the piezoelectric drive device has high operability (high convenience and easy to use). In addition, all the piezoelectric vibration modules abut on one driven portion and thus, a device configuration of the piezoelectric drive device can be simplified and miniaturization can be achieved.

A robot according to another aspect of the invention includes the piezoelectric drive device according to the aspect of the invention.

With this configuration, it is possible to achieve the effects of the piezoelectric drive device according to the aspect of the invention and obtain a robot having high reliability.

An electronic component transport apparatus according to another aspect of the invention includes the piezoelectric drive device according to the aspect of the invention.

With this configuration, it is possible to achieve the effects of the piezoelectric drive device according to the aspect of the invention and obtain an electronic component transport apparatus having high reliability.

A printer according to another aspect of the invention includes the piezoelectric drive device according to the aspect of the invention.

With this configuration, it is possible to achieve the effects of the piezoelectric drive device according to the aspect of the invention and obtain a printer having high reliability.

A projector according to another aspect of the invention includes the piezoelectric drive device according to the aspect of the invention.

With this configuration, it is possible to achieve the effects of the piezoelectric drive device according to the aspect of the invention and obtain a projector having high reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a piezoelectric drive device, a drive method of the piezoelectric drive device, a robot, an electronic component transport apparatus, a printer, and a projector according to the invention will be described in detail based on embodiments illustrated in the accompanying drawings.

First Embodiment

First, a piezoelectric drive device according to a first embodiment of the invention will be described.

Figure 1:
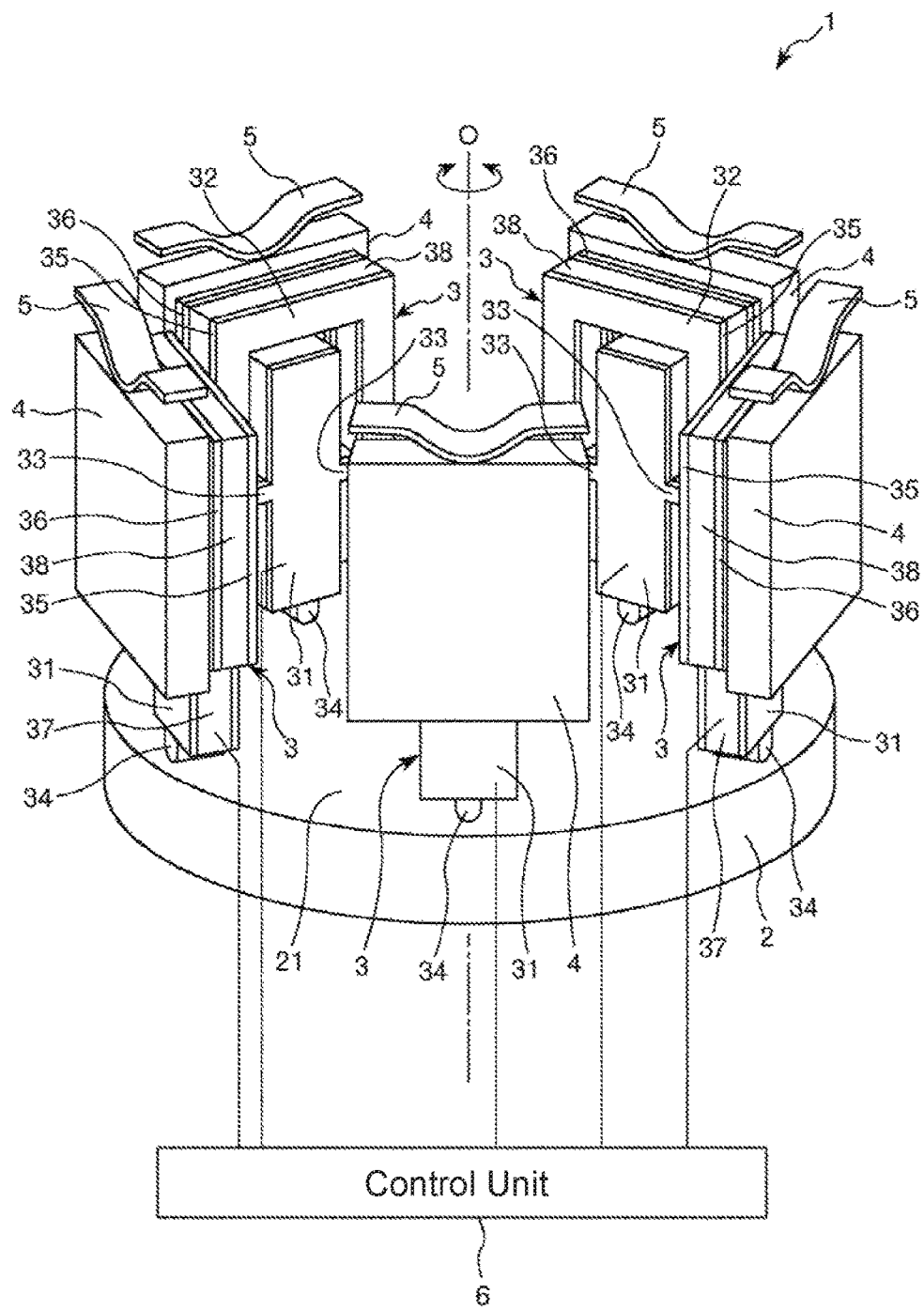
FIG. 1 is a perspective view illustrating a piezoelectric drive device according to a first embodiment of the invention.
Figure 2:
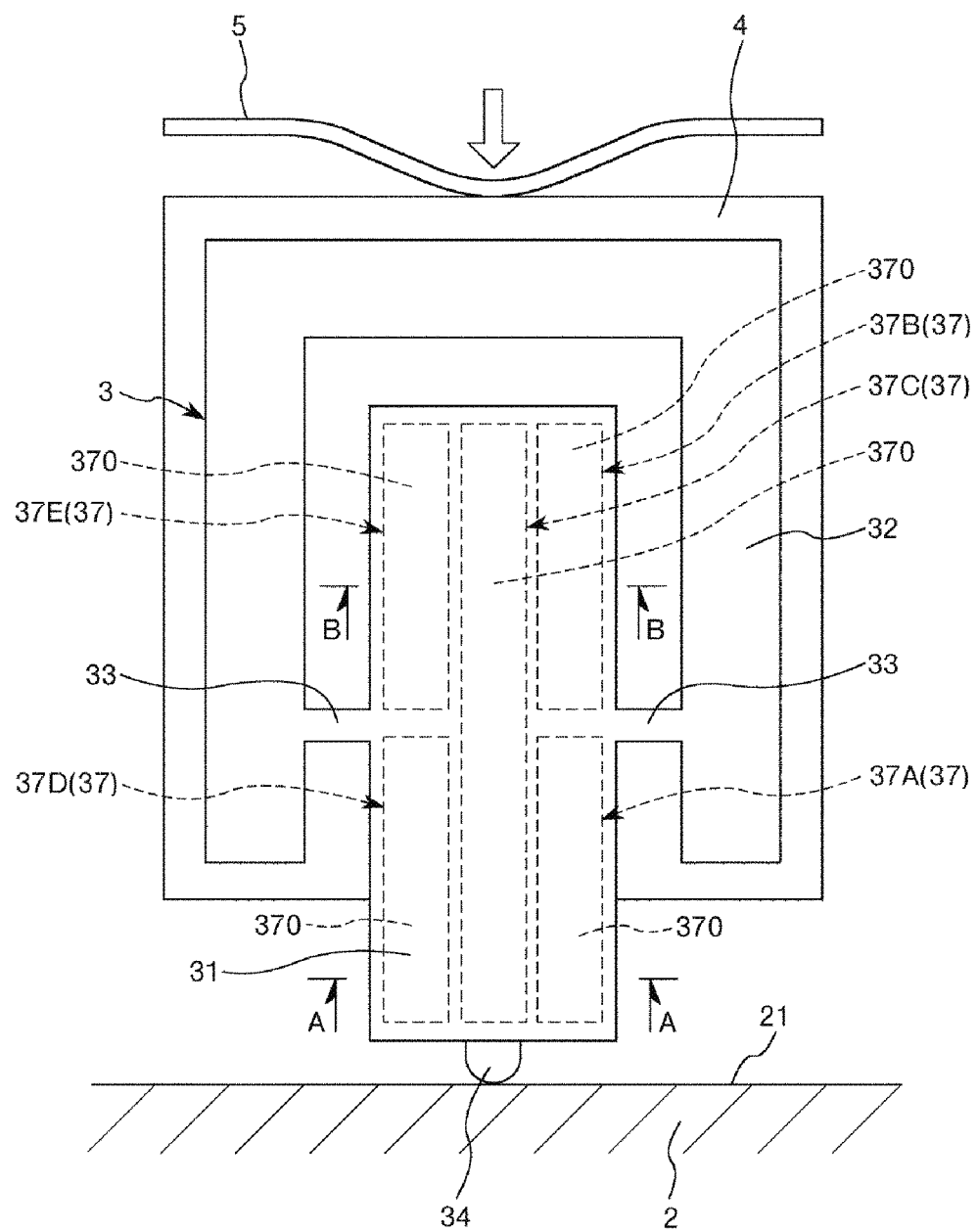
FIG. 2 is a plan view illustrating a piezoelectric vibration module included in the piezoelectric drive device illustrated in FIG. 1.
Figure 3:
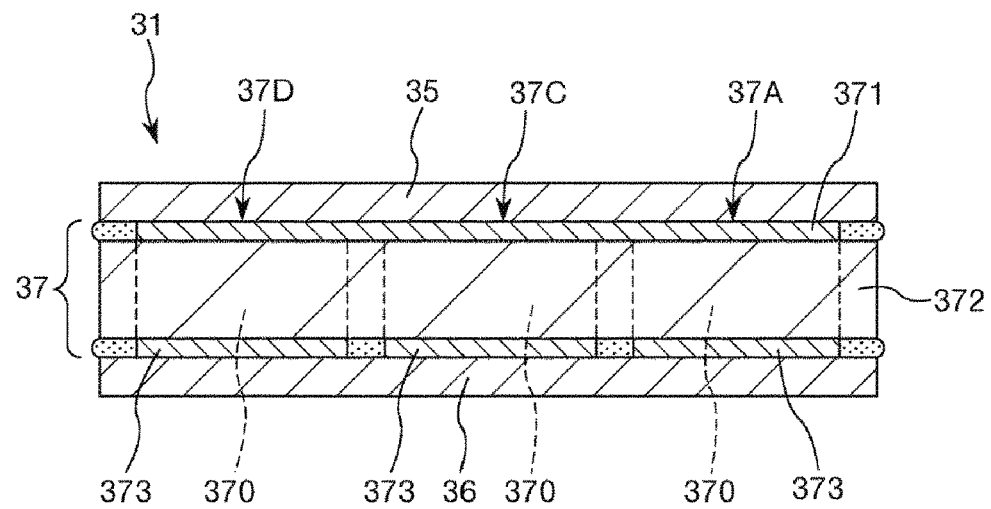
FIG. 3 is a cross-sectional view taken along the line A-A in FIG. 2.
Figure 4:
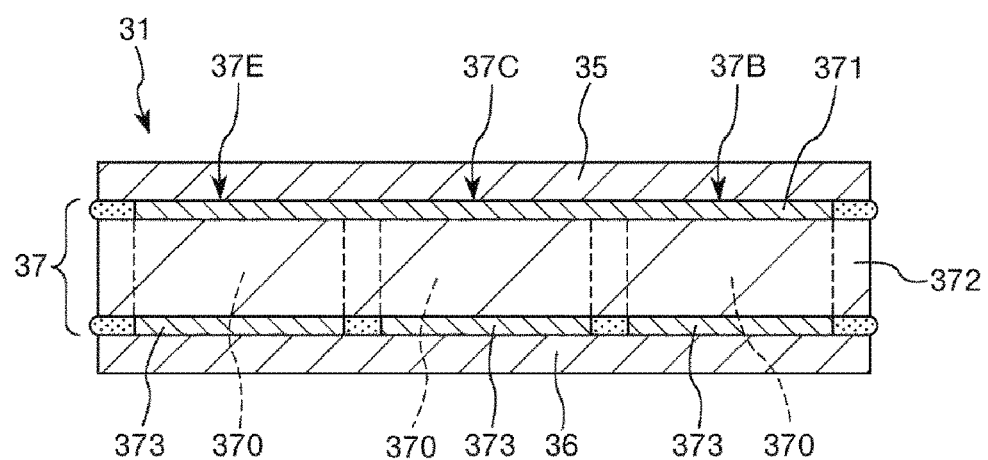
FIG. 4 is a cross-sectional view taken along the line B-B in FIG. 2.
Figure 5:
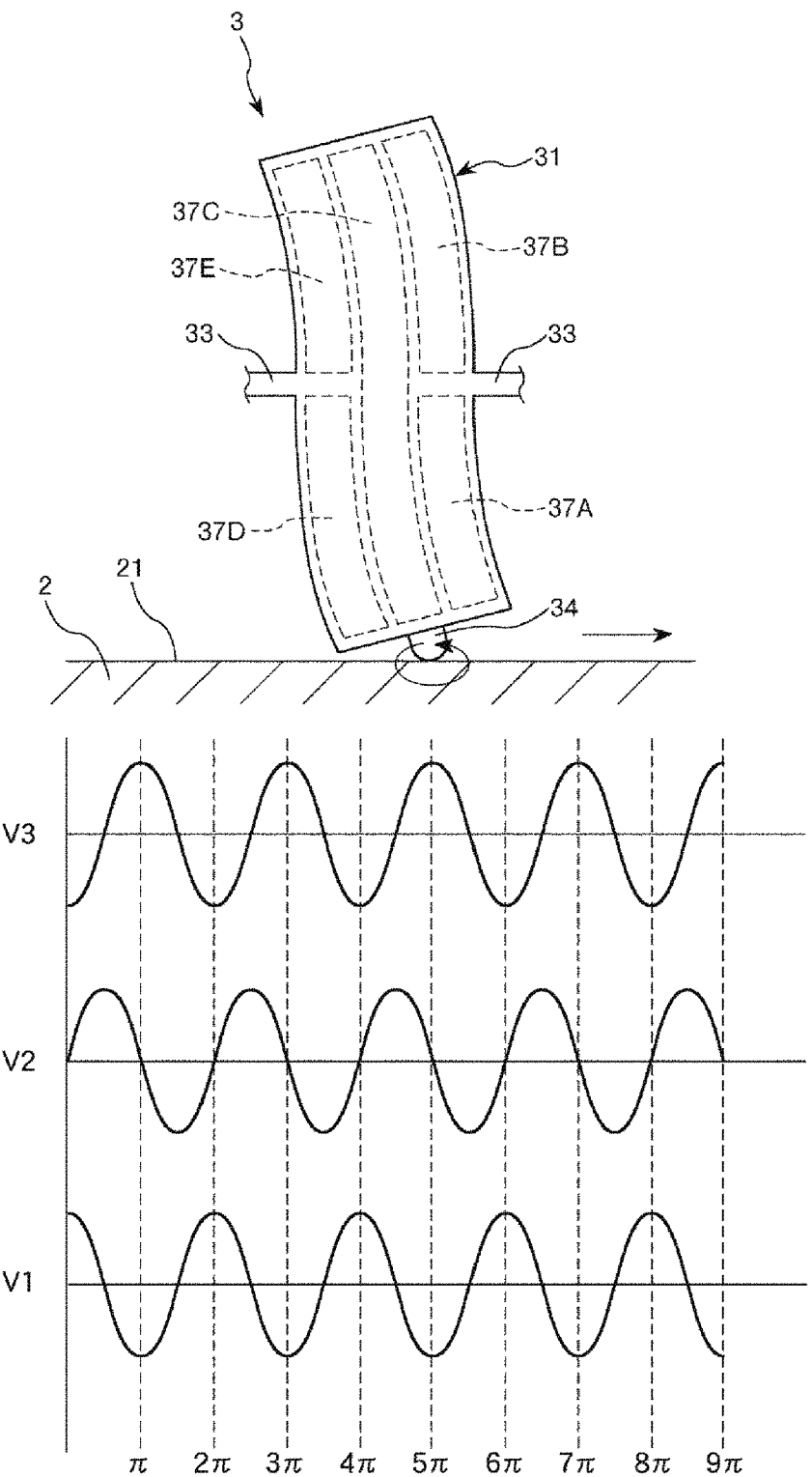
FIG. 5 is a diagram illustrating a forward rotation vibration mode of the piezoelectric vibration module illustrated in FIG. 2.
Figure 6:
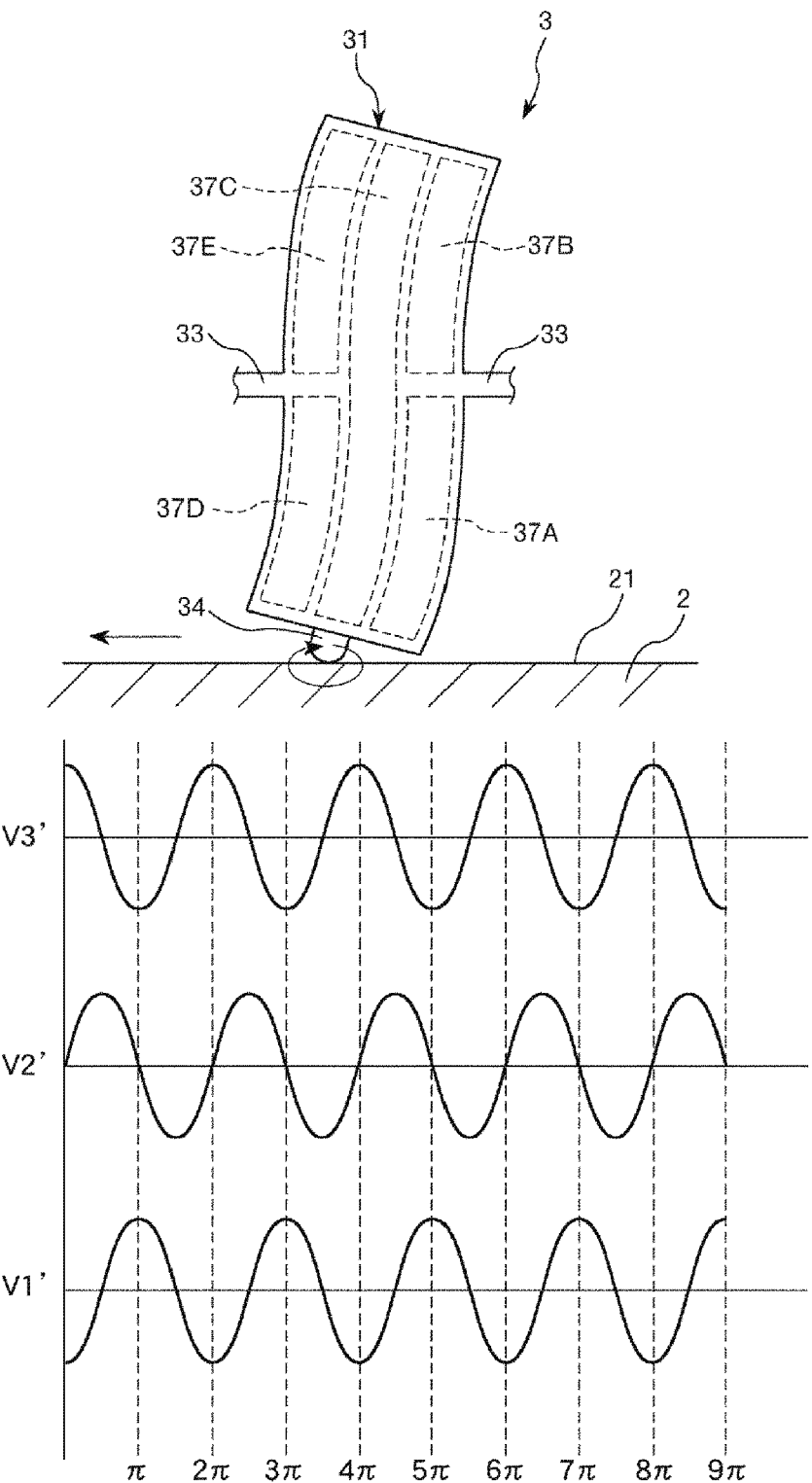
FIG. 6 is a view illustrating a reverse rotation vibration mode of the piezoelectric vibration module illustrated in FIG. 2.
Figure 7:
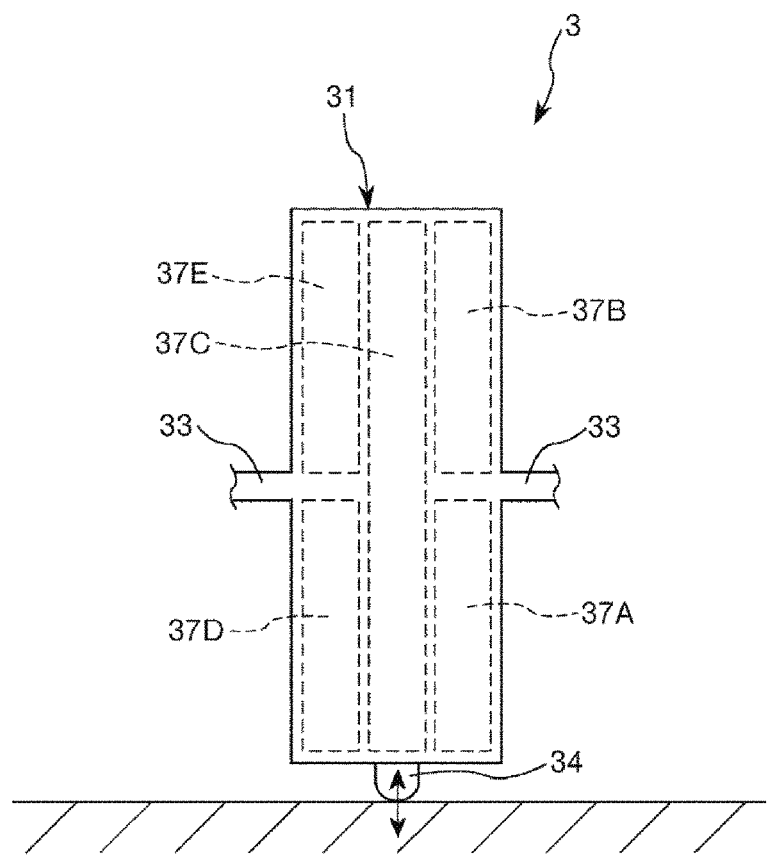
FIG. 7 is a diagram illustrating a longitudinal vibration mode of the piezoelectric vibration module illustrated in FIG. 2.
Figure 7:
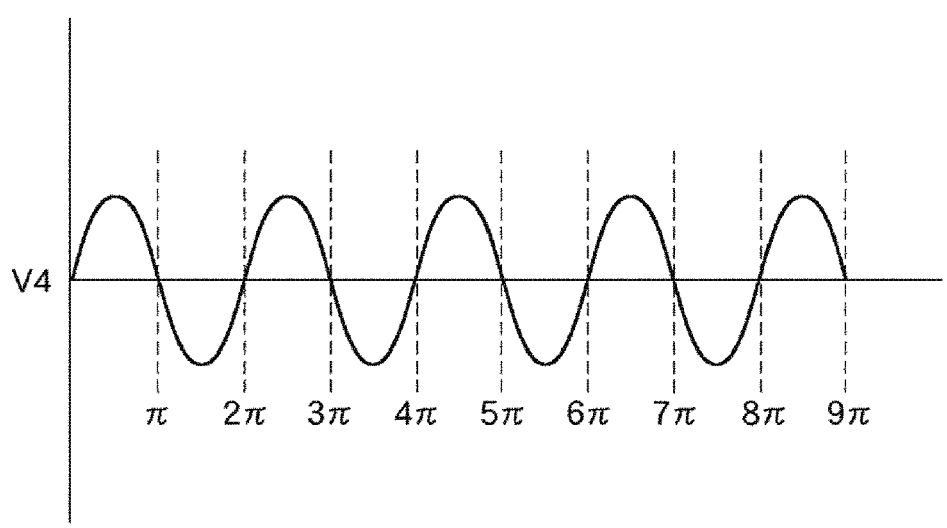

FIG. 1 is a perspective view illustrating a piezoelectric drive device according to a first embodiment of the invention. FIG. 2 is a plan view illustrating a piezoelectric vibration module included in the piezoelectric drive device illustrated in FIG. 1. FIG. 3 is a cross-sectional view taken along line A-A in FIG. 2. FIG. 4 is a cross-sectional view taken along line B-B in FIG. 2. FIG. 5 is a diagram illustrating a forward rotation vibration mode of the piezoelectric vibration module illustrated in FIG. 2. FIG. 6 is a view illustrating a reverse rotation vibration mode of the piezoelectric vibration module illustrated in FIG. 2. FIG. 7 is a diagram illustrating a longitudinal vibration mode of the piezoelectric vibration module illustrated in FIG. 2. Each of FIG. 8 to FIG. 14 is a diagram for explaining a drive method of the piezoelectric drive device illustrated in FIG. 1. In the following description, for convenience of description, the upper side in FIGS. 1 to 14 is also referred to as "upper" and the lower side in FIGS. 1 to 14 is also referred to as "lower".

A piezoelectric drive device 1 illustrated in FIG. 1 is used as a rotary motor (ultrasonic motor), and includes a rotor 2 (driven portion) rotatable around a rotation axis O, a plurality of piezoelectric vibration modules 3 that abut on an upper surface 21 of the rotor 2, a stage 4 that supports each piezoelectric vibration module 3, an urging portion 5 that urges each piezoelectric vibration module 3 toward the rotor 2 via the stage 4, and a control unit 6 that independently controls driving of each piezoelectric vibration module 3. In such a piezoelectric drive device 1, vibration patterns of the plurality of piezoelectric vibration modules 3 are independently controlled (changed) 3 by the control unit 6 so as to make it possible to change a rotation speed (angular velocity) and torque of the rotor 2. For that reason, for example, the piezoelectric vibration modules are driven at a high speed drive mode until it approaches a target rotation angle (number of rotations) of the rotor 2 and are switched to a low speed drive mode when it approaches the target rotation angle, so that it is possible to more accurately adjust the rotor 2 to the target rotation angle in a shorter time. As such, according to the piezoelectric drive device 1, it is possible to realize a device having high operability (high convenience and easy to use). All the piezoelectric vibration modules 3 abut with the same rotor 2 and thus, it is also possible to simplify a device configuration and achieve miniaturization of the piezoelectric drive device 1. Hereinafter, the piezoelectric drive device 1 will be described in detail.

The rotor 2 has a disc shape and is rotatably bearing supported around the rotation axis O. However, a configuration of the rotor 2 is not particularly limited.

A plurality of the piezoelectric vibration modules 3 are disposed to abut with an upper surface 21 of the rotor 2. The plurality of piezoelectric vibration modules 3 are disposed at equal intervals around the rotation axis O. In the first embodiment, although five piezoelectric vibration modules 3 are disposed, the number of piezoelectric vibration modules 3 is not particularly limited. Further, as long as the rotor 2 can be rotated, disposition of the piezoelectric vibration modules 3 is also not particularly limited.

As illustrated in FIG. 2, the piezoelectric vibration module 3 includes a vibration portion 31 capable of vibrating, a support portion 32 supporting the vibration portion 31, a pair of connection portions 33 connecting the vibration portion 31 and the support portion 32, and a transmission portion 34 provided in the vibration portion 31. The vibration portion 31 is formed in a substantially rectangular plate shape and a transmission portion 34 is provided at a tip portion thereof (end portion of the rotor 2 side). Further, the support portion 32 has a U shape to surround a base side of the vibration portion 31.

The piezoelectric vibration module 3 having such a configuration abuts against the upper surface 21 of the rotor 2 at the tip end of the transmission portion 34 and is fixed to the stage 4 at the support portion 32. The stage 4 is urged toward the rotor 2 side (lower side in FIG. 2) by the urging portion 5 such as a spring member (leaf spring, coil spring) or the like, so that the transmission portion 34 is in contact with the upper surface 21 of the rotor 2 with a sufficient frictional force. For that reason, slipping is suppressed and vibration of the vibration portion 31 can be efficiently transmitted to the rotor 2 via the transmission portion 34.

As illustrated in FIG. 1, the piezoelectric vibration module 3 has a first substrate 35 and a second substrate 36. The vibration portion 31 has a piezoelectric element 37 provided between the first substrate 35 and the second substrate 36 and the support portion 32 has a spacer 38 provided between the first substrate 35 and the second substrate 36. The spacer 38 functions as a spacer for aligning the thickness of the support portion 32 to the thickness of the vibration portion 31.

As illustrated in FIG. 2, the piezoelectric element 37 includes five piezoelectric elements 37A, 37B, 37C, 37D, and 37E. Then, the piezoelectric elements 37A and 37B are positioned on one side (right side in FIG. 2) in a width direction of the vibration portion 31 and are disposed side by side in a longitudinal direction of the vibration portion 31. The piezoelectric elements 37D and 37E are positioned on the other side (left side in FIG. 2) in the width direction of the vibration portion 31 and are disposed side by side in the longitudinal direction of the vibration portion 31. The piezoelectric element 37C is positioned at the center portion in the width direction of the vibration portion 31 and is disposed along the longitudinal direction of the vibration portion 31. The configuration of the piezoelectric element 37 is not particularly limited, and for example, the piezoelectric element 37C may be omitted.

As illustrate in FIGS. 3 and 4, each of the five piezoelectric elements 37A, 37B, 37C, 37D, and 37E includes a piezoelectric body 372, a first electrode 371 provided on the upper surface of the piezoelectric body 372, and a second electrode 373 provided on the lower surface of the piezoelectric body 372. A region sandwiched between the first electrode 371 and the second electrode 373 of the piezoelectric body 372 corresponds to a vibration region 370.

The first electrode 371 is a common electrode commonly provided for the piezoelectric elements 37A, 37B, 37C, 37D, and 37E. On the other hand, the second electrode 373 is an individual electrode individually provided for each of the piezoelectric elements 37A, 37B, 37C, 37D, and 37E. The piezoelectric body 372 is provided integrally with the piezoelectric elements 37A, 37B, 37C, 37D, and 37E in common. The piezoelectric bodies 372 may be provided separately for each of the piezoelectric elements 37A, 37B, 37C, 37D, and 37E.

As an electric field in a direction along the thickness direction of the vibration portion 31 is applied, the piezoelectric body 372 expands and contracts in the direction (alignment direction of the piezoelectric vibration module 3 and the rotor 2) along the longitudinal direction of the vibration portion 31. As constituent material of the piezoelectric body 372, for example, piezoelectric ceramics such as lead zirconate titanate (PZT), barium titanate, lead titanate, potassium niobate, lithium niobate, lithium tantalate, sodium tungsten, zinc oxide, barium strontium titanate (BST), strontium bismuth tantalate (SBT), lead metaniobate, scandium lead niobate, and the like can be used. The piezoelectric body 372 made of piezoelectric ceramics may be formed of, for example, a bulk material, or may be formed by a sol-gel method or a sputtering method. In addition to the piezoelectric ceramics, polyvinylidene fluoride described above, quartz, or the like may be used as the constituent material of the piezoelectric body 372.

In the piezoelectric vibration module 3 configured as described above, when a drive voltage supplied from the control unit 6 is applied between the first electrode 371 and the second electrode 373, each of the piezoelectric elements 37A, 37B, 37C, 37D, and 37E vibrates according to the pattern of the drive voltage and the entirety of the vibration portion 31 vibrates.

Next, a vibration mode of the piezoelectric vibration module 3 will be described. The piezoelectric vibration module 3 has a forward rotation vibration mode in which the transmission portion 34 rotates in a forward direction (first direction), a reverse rotation vibration mode in which the transmission portion 34 rotates in a reverse direction (second direction) which is a direction opposite to the forward direction, and a longitudinal vibration mode in which the transmission portion 34 vibrates in a longitudinal direction of the vibration portion 31 and is adapted to be able to select (switch) these vibration modes.

As illustrated in FIG. 5, the forward rotation vibration mode is a vibration mode in which the transmission portion 34 is caused to be elliptically moved counterclockwise in the figure. In order to perform such a rotation vibration mode, for example, the voltage V1 in FIG. 5 is applied to the piezoelectric elements 37A and 37E, the voltage V2 is applied to the piezoelectric element 37C, and the voltage V3 is applied to the piezoelectric elements 37B and 37D. With this, the vibration portion 31 performs lateral vibration that bends at second order in the width direction (direction intersecting (orthogonal to) the longitudinal direction) thereof while performing longitudinal vibration which expands and contracts in the longitudinal direction (alignment direction of the piezoelectric vibration module 3 and the rotor 2 and pressing direction by the urging portion 5) of the vibration portion 31. Such longitudinal vibration and lateral vibration are combined and the vibration portion 31 bends and vibrates in an S shape and accordingly, the transmission portion 34 performs counterclockwise rotation vibration (elliptical vibration) which is composite vibration of the longitudinal vibration and the lateral vibration. However, a voltage pattern to be applied to the piezoelectric vibration module 3 is not particularly limited as long as it is possible to cause the transmission portion 34 to be elliptically moved counterclockwise.

As illustrated in FIG. 6, the reverse rotation vibration mode is a vibration mode in which the transmission portion 34 is caused to be elliptically moved clockwise in the figure. In order to perform such a rotation vibration mode, for example, the voltage V1' in FIG. 6 is applied to the piezoelectric elements 37A and 37E, the voltage V2' is applied to the piezoelectric element 37C, and the voltage V3' is applied to the piezoelectric elements 37B and 37D. With this, the vibration portion 31 performs lateral vibration that bends at second order in the width direction thereof while performing longitudinal vibration that expands and contracts in the longitudinal direction thereof. Such longitudinal vibration and lateral vibration are combined and the vibration portion 31 bends and vibrates in a reverse S shape and accordingly, the transmission portion 34 performs clockwise rotation vibration (elliptical vibration) which is composite vibration of the longitudinal vibration and the lateral vibration. However, a voltage pattern to be applied to the piezoelectric vibration module 3 is not particularly limited as long as it is possible to cause the transmission portion 34 to be elliptically moved clockwise.

As illustrated in FIG. 7, the longitudinal vibration mode is a vibration mode in which the transmission portion 34 is caused to vibrate in the longitudinal direction (alignment direction of the piezoelectric vibration module 3 and the rotor 2 and pressing direction by the urging portion 5) of the vibration portion 31. In order to perform such a longitudinal vibration mode, for example, the voltage V4 in FIG. 7 is applied to the piezoelectric element 37C, and no voltage is applied to the other piezoelectric elements 37A, 37B, 37D, and 37E. With this, the vibration portion 31 performs longitudinal vibration that expands and contracts in its longitudinal direction and accordingly, the transmission portion 34 performs longitudinal vibration. In particular, the voltage V4 is applied only to the piezoelectric element 37C so as to make it possible to make amplitude of the longitudinal vibration in the longitudinal vibration mode substantially equal to amplitude of the longitudinal vibration in the forward rotation vibration mode and the reverse rotation vibration mode. However, the voltage pattern to be applied to the piezoelectric vibration module 3 is not particularly limited as long as the transmission portion 34 can be longitudinally vibrated.

The longitudinal vibration mode of the first embodiment is substantially a vibration mode including only longitudinal vibration. As such, the longitudinal vibration mode is preferably a vibration mode including only longitudinal vibration. However, as the longitudinal vibration mode, for example, lateral vibration having amplitude smaller than that of the forward rotation vibration mode and the reverse rotation vibration mode described above may be included. That is, a mode in which rotation vibration that generates a drive force smaller than that of the forward rotation vibration mode and the reverse rotation vibration mode is caused to be performed may be available.

The piezoelectric vibration module 3 has been described as above. The piezoelectric vibration module 3 is not particularly limited as long as it can be driven at the forward rotation vibration mode, the reverse rotation vibration mode, and the longitudinal vibration mode as described above. For example, the support portion 32 and the connection portion 33 may be omitted and the configuration of the piezoelectric element 37 (number and disposition of piezoelectric elements) is also not particularly limited. Further, the piezoelectric vibration module 3 may have, for example, a configuration in which a plurality of the piezoelectric vibration modules 3 of the first embodiment are stacked (superimposed). With this, the piezoelectric vibration module 3 having a greater drive force is obtained.

Next, a drive method of the piezoelectric drive device 1 will be described. The piezoelectric drive device 1 has a high speed drive mode (first drive mode) in which the rotor 2 is rotated around the rotation axis O at high speed (high angular velocity) and a low speed drive mode (second drive mode) in which the rotor 2 is rotated around the rotation axis O at a speed lower than the high speed drive mode (low angular velocity), a holding mode (eighth drive mode) in which the rotor 2 is held (restricting rotation), and a manual mode (seventh drive mode) in which the rotor 2 is rotatable and the rotor 2 can be manually rotated, and is adapted to enable one of the drive modes to be selected. The selection of the drive mode is performed by the control unit 6. The control unit 6 can select the drive mode by changing the drive voltage applied to each piezoelectric vibration module 3. Hereinafter, these drive modes will be described in detail.

Figure 8:
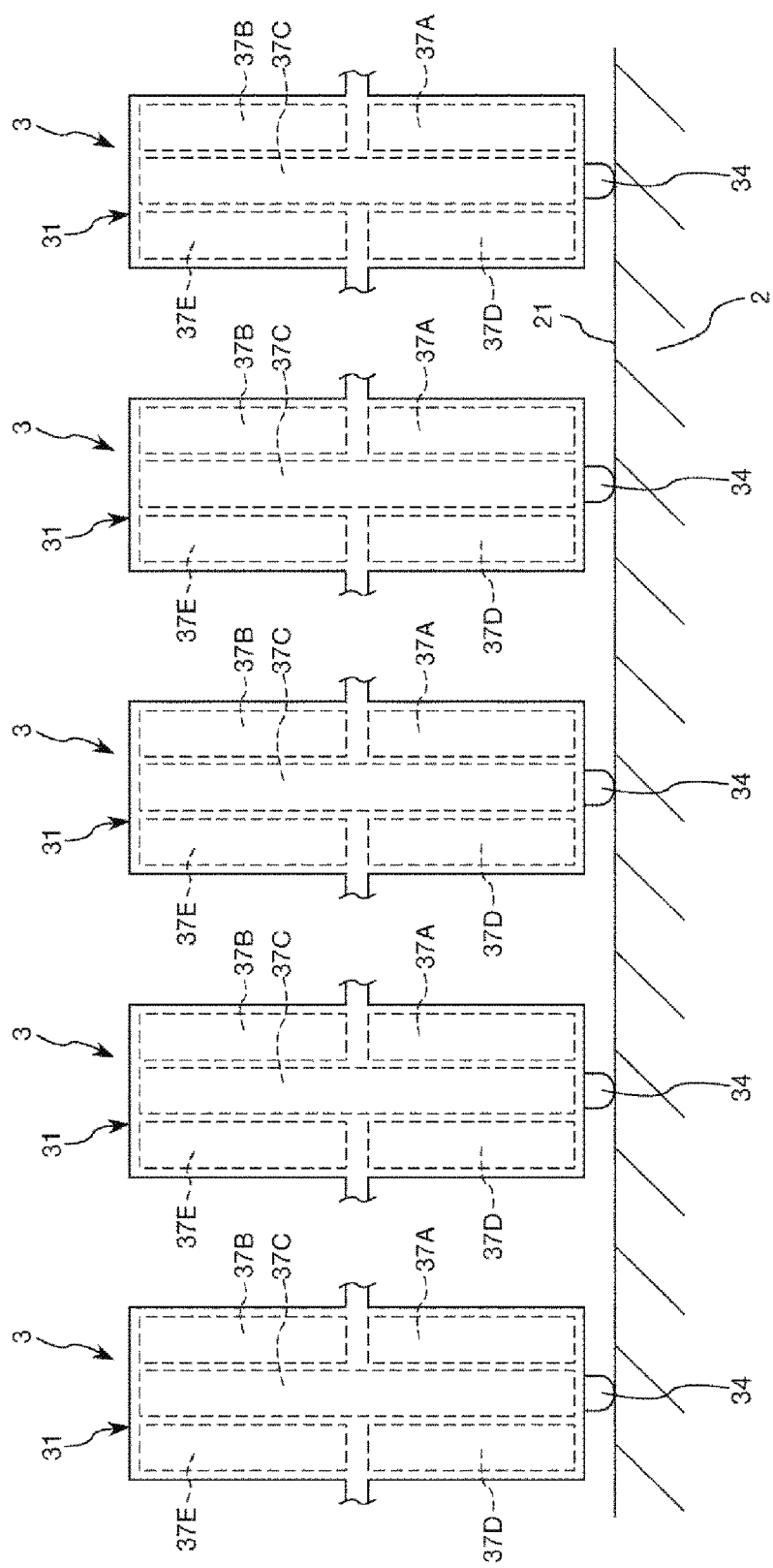
FIG. 8 is a diagram for explaining a drive method of the piezoelectric drive device illustrated in FIG. 1.

First, the holding mode will be described. The holding mode is a drive mode for restricting rotation (movement) of the rotor 2. In the holding mode, as illustrated in FIG. 8, all the piezoelectric vibration modules 3 stop driving (vibrating). As described above, each piezoelectric vibration module 3 is urged toward the rotor 2 by the urging portion 5 and each transmission portion 34 abuts on the upper surface 21 of the rotor 2 with a sufficient frictional force. For that reason, in this state, the rotor 2 is held by each piezoelectric vibration module 3 and rotation (movement) of the rotor 2 is blocked. By having such a holding mode, it is possible to hold the rotor 2 at a predetermined position (rotation angle). Further, unintended movement (rotation) of the rotor 2 can be suppressed and safety and usability (convenience) of the piezoelectric drive device 1 are improved.

Figure 9:
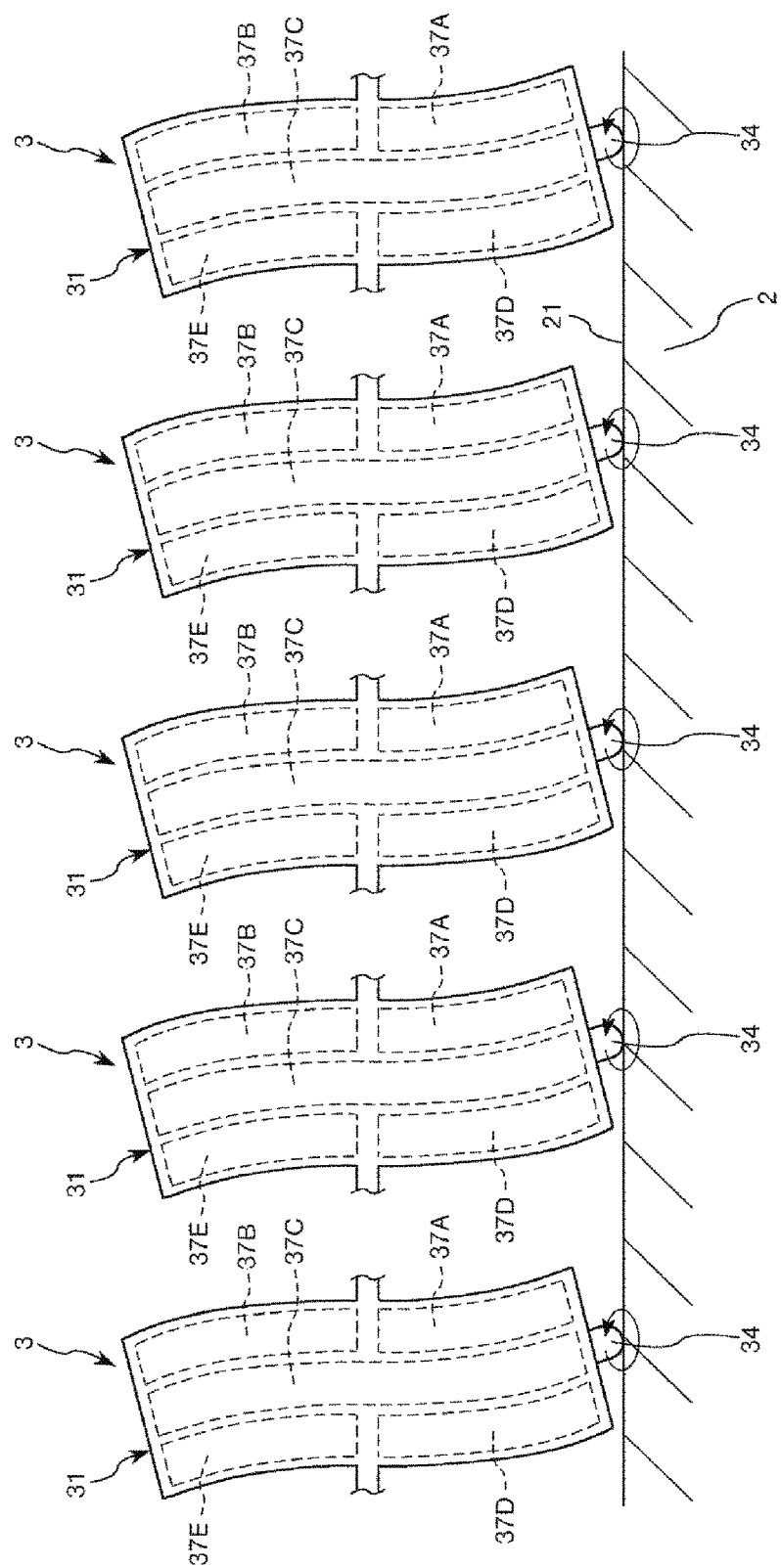
FIG. 9 is another diagram for explaining a drive method of the piezoelectric drive device illustrated in FIG. 1.

Next, a high speed drive mode will be described. The high speed movement mode is a drive mode in which the rotor 2 is rotated (moved) at high speed and with high torque. In the high speed movement mode, as illustrated in FIG. 9, each piezoelectric vibration module 3 is driven in the forward rotation vibration mode. With this, the transmission portion 34 of each piezoelectric vibration module 3 performs an elliptical motion in the forward direction such that the rotor 2 is sent out in the forward direction and the rotor 2 rotates in the forward direction. In the high speed drive mode, all the piezoelectric vibration modules 3 are driven in the forward rotation vibration mode and thus, it is possible to rotate the rotor 2 at high speed and with high torque.

Next, the low speed drive mode will be described. The low speed drive mode is a drive mode in which the rotor 2 is rotated (moved) at a lower speed and lower torque than the high speed drive mode described above. The low speed drive mode further includes a first low speed drive mode (sixth drive mode), a second low speed drive mode (fifth drive mode) for rotating the rotor 2 at lower speed and lower torque than the first low speed drive mode, a third low speed drive mode (third drive mode), and a fourth low speed drive mode (fourth drive mode).

Figure 10:
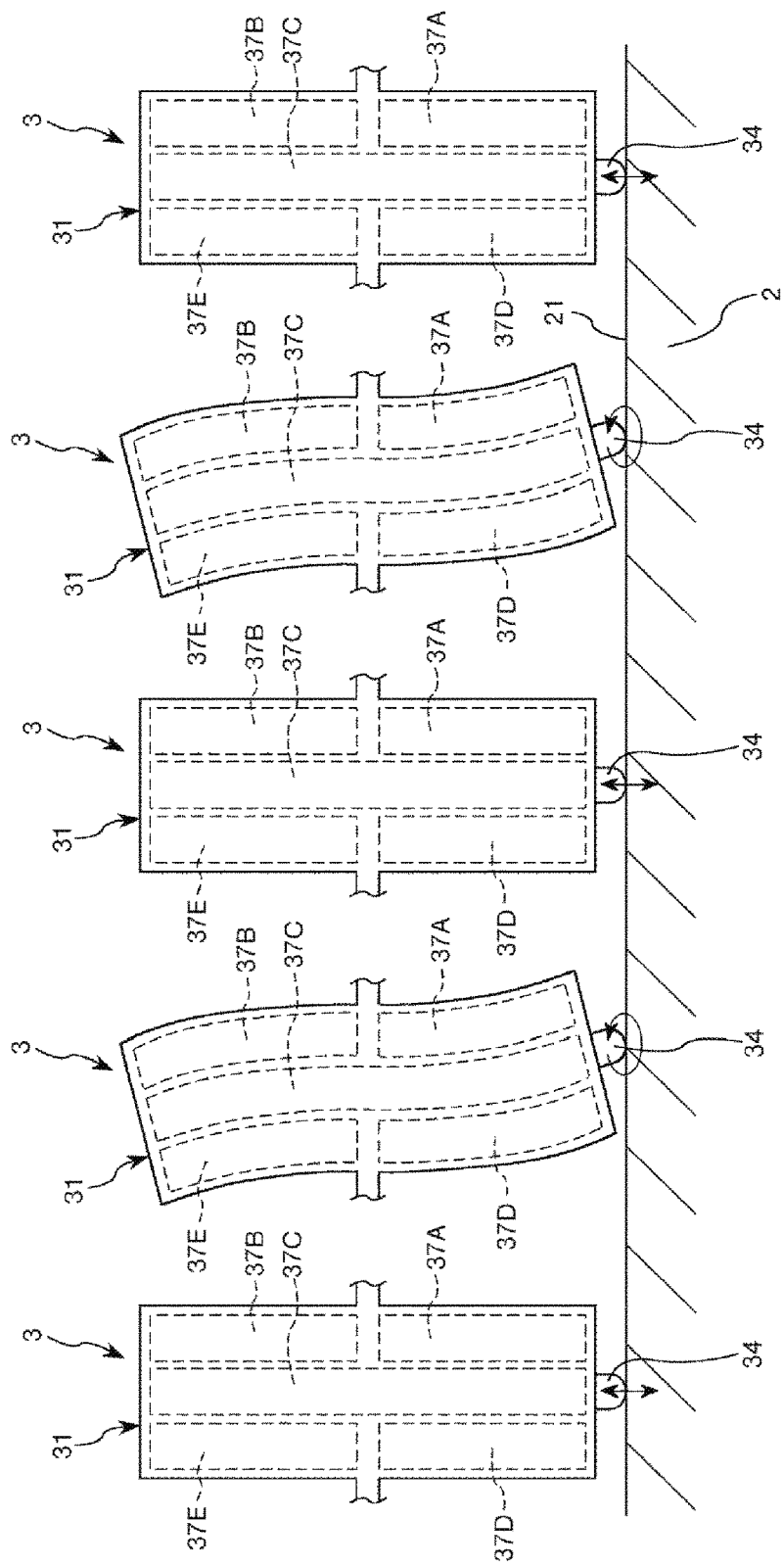
FIG. 10 is another diagram for explaining a drive method of the piezoelectric drive device illustrated in FIG. 1.

In the first low speed drive mode, as illustrated in FIG. 10, two piezoelectric vibration modules 3 of the five piezoelectric vibration modules 3 are driven in the forward rotation vibration mode and the remaining three piezoelectric vibration modules 3 are driven in the longitudinal vibration mode. In such a first low speed drive mode, the drive force for rotating the rotor 2 is generated by two piezoelectric vibration modules 3, which is fewer than that of the high speed drive mode, and thus, it is possible to rotate the rotor 2 at a lower speed and a lower torque than at the high speed drive mode. The longitudinal vibration mode occurring in the remaining three piezoelectric vibration modules 3 is a vibration mode in which rotation of the rotor 2 is allowed without substantially generating the drive force for rotating the rotor 2.

More specifically, as described above, the piezoelectric vibration module 3 is urged toward the rotor 2 and in a non-driven state, the transmission portion 34 of the piezoelectric vibration module 3 abuts on the upper surface 21 of the rotor 2 with a sufficient frictional force. For that reason, when a piezoelectric vibration module 3 which is not driven is present, a problem that the piezoelectric vibration module 3 becomes a resistance (brake) and the rotor 2 cannot be rotated even when it is attempted to rotate the rotor 2 by driving another piezoelectric vibration module 3 or a rotation speed of the rotor 2 is lowered even when the rotor 2 is rotated and the like occurs.

Thus, regarding the piezoelectric vibration module 3 which is not driven (which does not generate the drive force) in the forward rotation vibration mode, it is necessary to reduce the frictional force with the rotor 2 and to allow the rotation of the rotor 2, which is realized by the longitudinal vibration mode. This vibration mode corresponds to reciprocating vibration in the direction approaching and moving away from the rotor 2 and thus, the frictional force with the rotor 2 (frictional force becomes 0 when the transmission portion 34 moves away from the rotor 2) decreases when vibration is performed in the direction moving away from the rotor 2. For that reason, the frictional force between the transmission portion 34 and the rotor 2 is smaller than that in the non-driven state on average, so that movement of the rotor 2 can be allowed.

The first low speed drive mode has been described as above. In the first embodiment, although two piezoelectric vibration modules 3 are driven at the forward rotation vibration mode, the number of the piezoelectric vibration modules 3 driven at the forward rotation vibration mode is not particularly limited as long as the number of the piezoelectric vibration modules 3 driven at the forward rotation vibration mode is smaller than that of the high speed drive mode, for example, it may be four or three. Further, at the first low speed drive mode, the number of piezoelectric vibration modules 3 driven at the forward rotation vibration mode may be changed between two and four. With this, the rotation speed and torque of the rotor 2 can be further changed at the first low speed drive mode.

The piezoelectric vibration module 3 driven at the longitudinal vibration mode is preferably changed, for example, at every predetermined time or every predetermined number of drive times. More specifically, for example, when a continuous drive time in the first low speed drive mode has passed a predetermined time, it is preferable that the vibration modes of the piezoelectric vibration module 3 being driven at the longitudinal vibration mode and the piezoelectric vibration module 3 being driven at the forward rotation vibration mode are switched and the piezoelectric vibration module which was driven at the longitudinal vibration mode in the previous first low speed drive mode is driven at the forward rotation vibration mode at the next first low speed drive mode without being driven at the longitudinal vibration mode. With this, it is possible to equalize the burden on the transmission portion 34 of each piezoelectric vibration module 3 and to suppress a problem that only the transmission portion 34 of a certain piezoelectric vibration module 3 wears out remarkably. For that reason, it is possible to prolong the life of the piezoelectric drive device 1 and it is possible to lengthen a maintenance interval. This also applies to the second low speed drive mode, the third low speed drive mode, and the fourth low speed drive mode to be described later.

Figure 11:
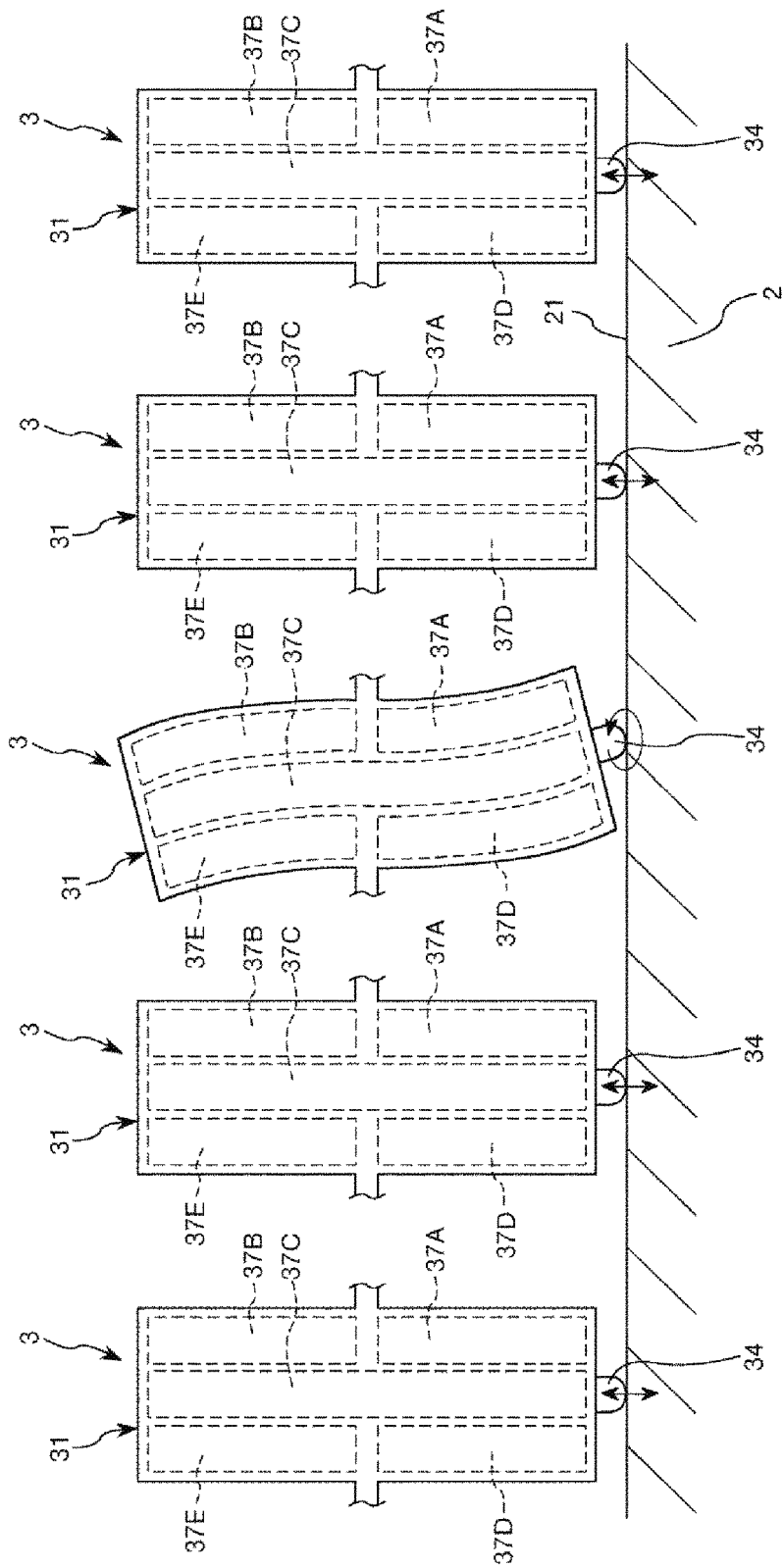
FIG. 11 is a diagram for explaining a drive method of the piezoelectric drive device illustrated in FIG. 1.

In the second low speed drive mode, as illustrated in FIG. 11, one piezoelectric vibration module 3 of the five piezoelectric vibration modules 3 is driven at the forward rotation vibration mode and the remaining four piezoelectric vibration modules 3 are driven at the longitudinal vibration mode. In such a second low speed drive mode, the drive force for rotating the rotor 2 is generated by one piezoelectric vibration module 3, which is fewer than that of the first low speed drive mode, and thus it is possible to rotate the rotor 2 at a lower speed and lower torque than those at the first low speed drive mode.

Figure 12:
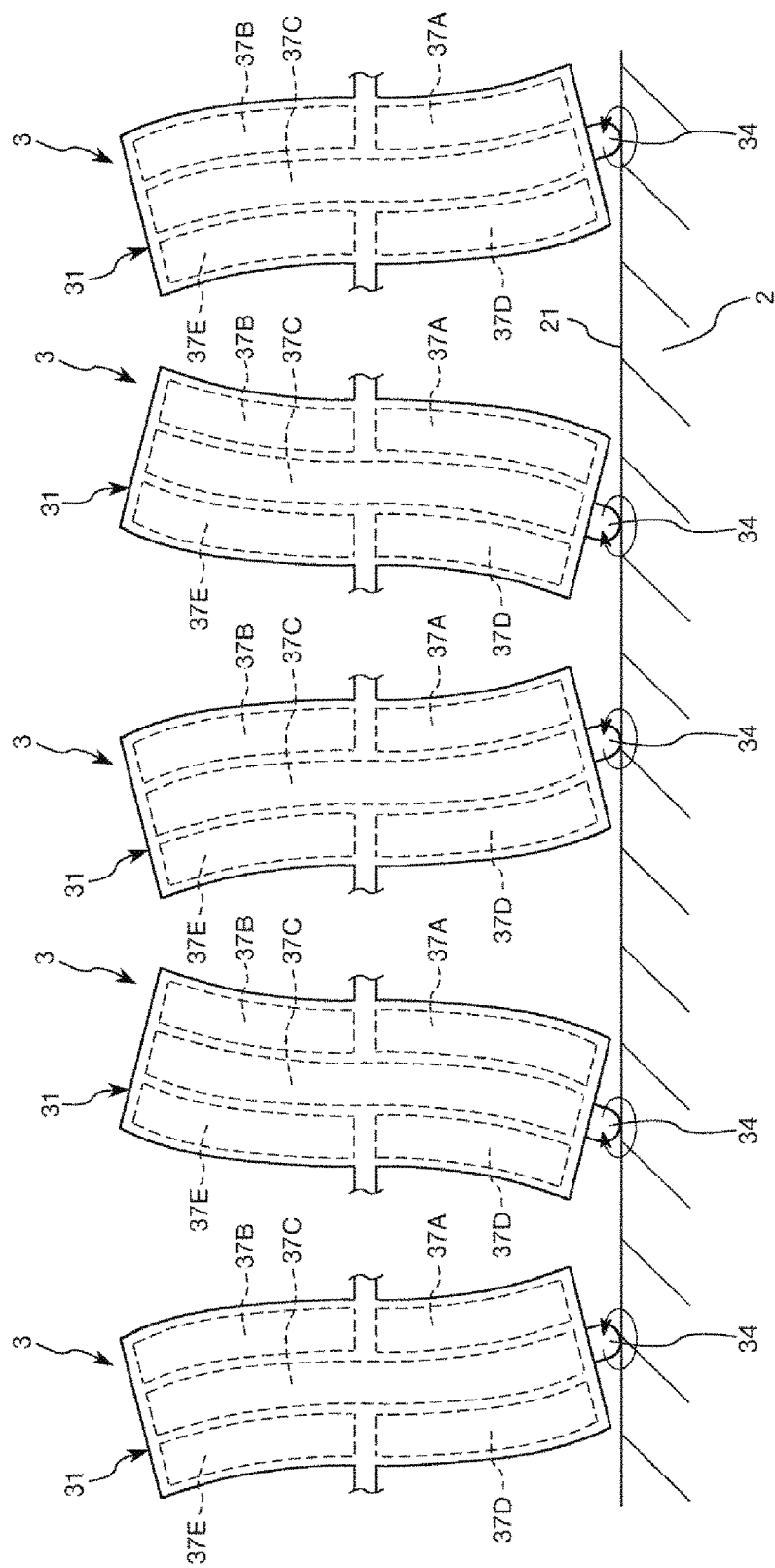
FIG. 12 is another diagram for explaining a drive method of the piezoelectric drive device illustrated in FIG. 1.

In the third low speed drive mode, as illustrated in FIG. 12, three piezoelectric vibration modules 3 of the five piezoelectric vibration modules 3 are driven at the forward rotation vibration mode and the remaining two piezoelectric vibration modules 3 are driven at the reverse rotation vibration mode. In such a third low speed drive mode, the drive force generated from two of the three piezoelectric vibration modules 3 being driven at the forward rotation vibration mode is canceled out (counter-balanced) with the drive force in the reverse direction generated from the two piezoelectric vibration modules 3 being driven at the reverse rotation vibration mode and the rotor 2 is substantially rotated only by the drive force generated from one piezoelectric vibration module 3 being driven at the forward rotation vibration mode. As such, in the third low speed drive mode, the drive force for rotating the rotor 2 is generated by one piezoelectric vibration module 3 and thus, the rotor 2 can be rotated at a lower speed and lower torque than those at the first low speed drive mode. In the third low speed drive mode, the number of the piezoelectric vibration modules 3 for generating the drive force for rotating the rotor 2 is the same as that of the second low speed drive mode described above and thus, the rotor 2 can be substantially rotated at the same rotation speed and torque as those at the second low speed drive mode.

Figure 13:
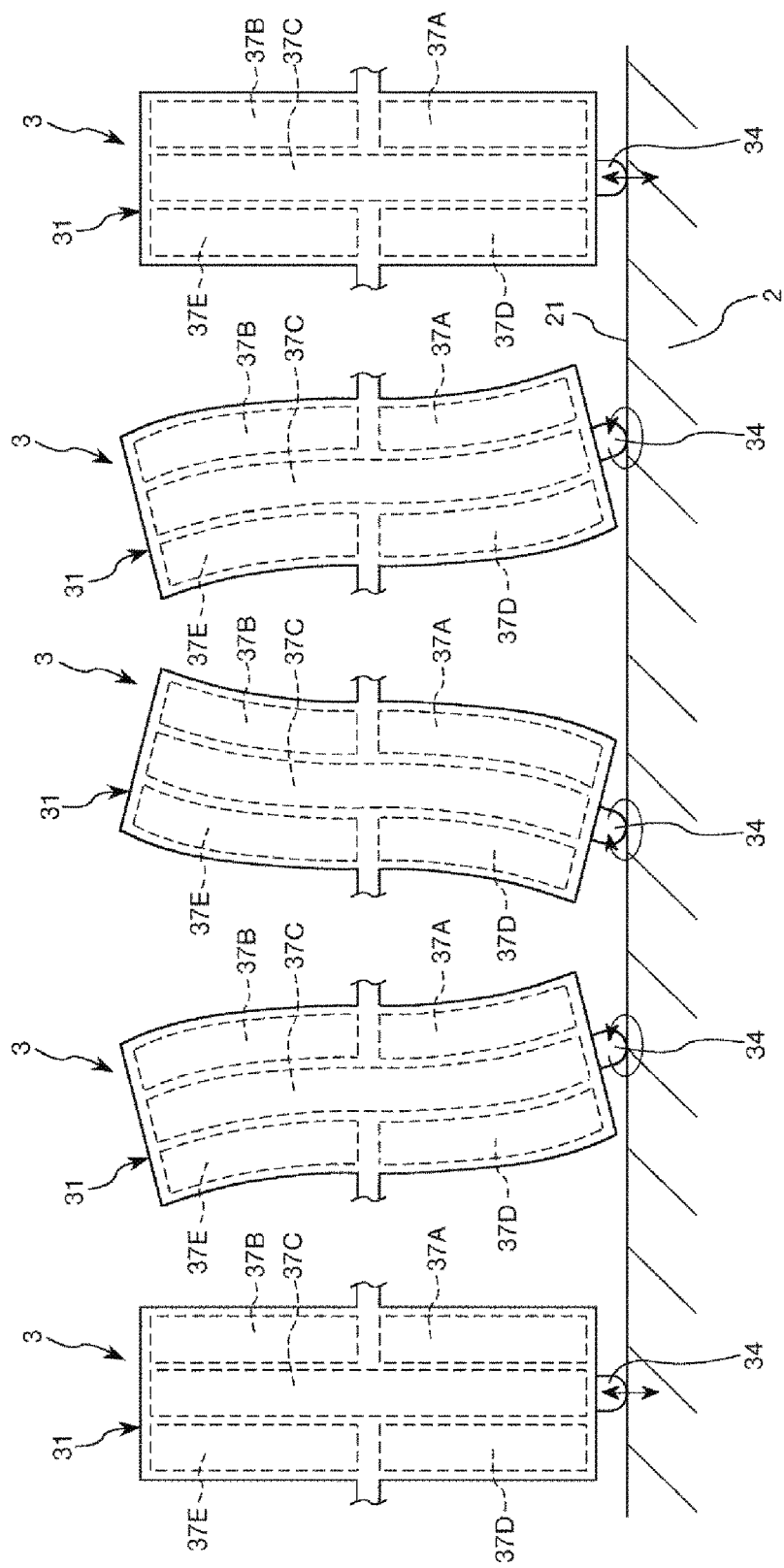
FIG. 13 is another diagram for explaining a drive method of the piezoelectric drive device illustrated in FIG. 1.

In the fourth low speed drive mode, as illustrated in FIG. 13, two piezoelectric vibration modules 3 of the five piezoelectric vibration modules 3 are driven at the forward rotation vibration mode, one piezoelectric vibration module 3 of the five piezoelectric vibration modules 3 is driven at the reverse rotation vibration mode, and the remaining two piezoelectric vibration modules 3 are driven at the longitudinal vibration mode. In such a fourth low speed drive mode, the drive force generated from one of the two piezoelectric vibration modules 3 being driven at the forward rotation vibration mode is canceled out (counter-balanced) with the drive force in the reverse direction generated from one piezoelectric vibration modules 3 being driven at the reverse rotation vibration mode and the rotor 2 is substantially rotated only by the drive force generated from one piezoelectric vibration module 3 being driven at the forward rotation vibration mode. As such, in the fourth low speed drive mode, the drive force for rotating the rotor 2 is generated by one piezoelectric vibration module 3 and thus, the rotor 2 can be rotated at a lower speed and lower torque than those at the first low speed drive mode. In the fourth low speed drive mode, the number of the piezoelectric vibration modules 3 for generating the drive force for rotating the rotor 2 is the same as that of the second low speed drive mode described above and thus, the rotor 2 can be substantially rotated at the same rotation speed and torque as those at the second low speed drive mode.

However, in this fourth low speed drive mode, the frictional force between the two piezoelectric vibration modules 3 driven in the longitudinal vibration mode and the rotor 2 slightly becomes a brake, so that the rotation speed and torque of the rotor 2 may be slightly lower than in the second low speed drive mode and the third low speed drive mode described above. In this case, for example, the fourth low speed drive mode may be used as a drive mode for rotating the rotor 2 at a lower speed and lower torque than those at the second low speed drive mode and the third low speed drive mode.

Figure 14:
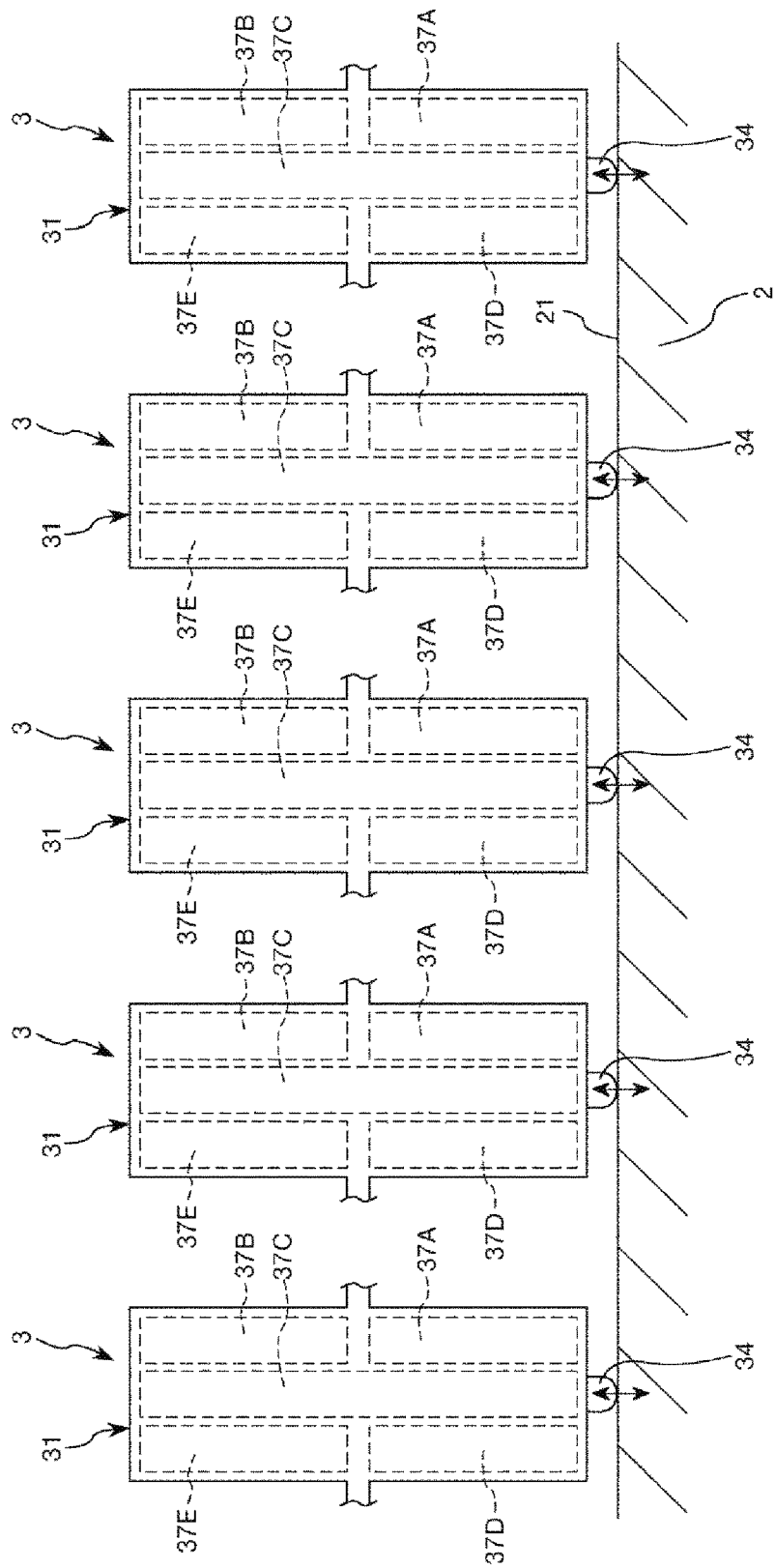
FIG. 14 is another diagram for explaining a drive method of the piezoelectric drive device illustrated in FIG. 1.

Next, the manual mode will be described. The manual mode is a drive mode in which the rotor 2 can be moved freely manually. In this manual mode, as illustrated in FIG. 14, all the piezoelectric vibration modules 3 are driven at the longitudinal vibration mode. With this, it becomes a state where the frictional force between all the piezoelectric vibration modules 3 and the rotor 2 can be reduced and the rotor 2 can be moved manually. In such a manual mode, all the piezoelectric vibration modules 3 perform only longitudinal vibration and thus, rotation of the rotor 2 due to driving of the piezoelectric vibration module 3 does not substantially occur.

Such a manual mode can be suitably used for, for example, a case where the operator wants to operate the rotor 2 manually (with his/her own hand) or a case of teaching (storing) the movement of the rotor 2 to the control unit 6 of the piezoelectric drive device 1.

The piezoelectric drive device 1 has been described as above. As described above, such a piezoelectric drive device 1 includes the plurality of piezoelectric vibration modules 3 each of which including the vibration portion 31 and the transmission portion 34 which abuts on the rotor 2 (driven portion) and transmits longitudinal vibration in an alignment direction in which the vibration portion 31 is aligned with the rotor 2 and rotation vibration (bending vibration) which is a composite vibration of the longitudinal vibration and lateral vibration (vibration in a direction intersecting the alignment direction in which the vibration portion 31 is aligned with the rotor 2) to the rotor 2. Thus, the piezoelectric drive device 1 has the high speed drive mode (first vibration mode) in which the transmission portions 34 of the plurality of piezoelectric vibration modules 3 rotationally vibrate in the forward direction (first direction), and the low speed drive mode (second vibration mode) in which the transmission portions 34 of some of the piezoelectric vibration modules 3 rotationally vibrate in the forward direction and the transmission portions 34 of others of the piezoelectric vibration modules 3 longitudinally vibrate or rotationally vibrate in the reverse direction (second direction) opposite to the forward direction. In such a piezoelectric drive device 1, it is possible to change the rotation speed and torque of the rotor 2 by switching between high speed drive mode and the second drive mode and thus, the piezoelectric drive device 1 has high operability (high convenience and easy to use). In addition, all the piezoelectric vibration modules 3 abut one rotor 2 and thus, a device configuration can be simplified and miniaturization can be achieved.

As described above, the drive method of the piezoelectric drive device 1, which includes the plurality of piezoelectric vibration modules 3 each of which including the vibration portion 31 and the transmission portion 34 which abuts on the rotor 2 and transmits longitudinal vibration in an alignment direction in which the vibration portion 31 is aligned with the rotor 2 and rotation vibration (bending vibration) which is a composite vibration of the longitudinal vibration and lateral vibration (vibration in a direction intersecting the alignment direction in which the vibration portion 31 is aligned with the rotor 2), is adapted to set the high speed drive mode (first drive mode) in which the transmission portions 34 of the plurality of piezoelectric vibration modules 3 are caused to rotationally vibrate in the forward direction (first direction) and the low speed drive mode (second drive mode) in which the transmission portions 34 of some of the piezoelectric vibration modules 3 are caused to rotationally vibrate in the forward direction and the transmission portions 34 of others of the piezoelectric vibration modules 3 are caused to longitudinally vibrate or rotationally vibrate in the reverse direction (second direction which is opposite to the forward direction) and to select and execute either the high speed drive mode or the low speed drive mode. According to such a drive method, it is possible to change the rotation speed and torque of the rotor 2 by switching between the high speed drive mode and the low speed drive mode and thus, the piezoelectric drive device 1 has high operability (high convenience and easy to use). In addition, all the piezoelectric vibration modules 3 abut on one rotor 2 and thus, a device configuration of the piezoelectric drive device 1 can be simplified and miniaturization can be achieved.

As described above, the low speed drive mode (second drive mode) includes a third low speed drive mode (third drive mode) in which the transmission portions 34 of some of the piezoelectric vibration modules 3 that rotationally vibrate in the forward direction (first direction), the transmission portions 34 of others of the piezoelectric vibration modules 3 that rotationally vibrate in the reverse direction (second direction), and the number of the piezoelectric vibration modules 3 in which the transmission portions 34 that rotationally vibrate in the forward direction is greater than the number of the piezoelectric vibration modules 3 in which the transmission portions 34 that rotationally vibrate in the reverse direction. With this, the low speed drive mode can be realized by a simpler method.

Here, in the third low speed drive mode, as described above, although the rotor 2 can be rotated at substantially the same rotation speed and torque as those at the second low speed drive mode and the fourth low speed drive mode, the following merits are obtained compared to the second low speed drive mode and the fourth low speed drive mode. That is, as the drive method of the piezoelectric drive device 1, for example, there is a method in which the piezoelectric drive device 1 is driven in the high speed drive mode until it approaches the target rotation angle (number of rotations) of the rotor 2 and the drive mode of the piezoelectric drive device 1 is switched to the low speed drive mode when it approaches the target rotation angle. In this case, it is possible to more smoothly perform switching from the high speed drive mode to the low speed drive mode (third low speed drive mode) by selecting the third low speed drive mode as the low speed drive mode.

More specifically, switching from the high speed drive mode to the third low speed drive mode is performed by switching the drive mode of the two piezoelectric vibration modules 3 from the forward rotation vibration mode to the reverse rotation vibration mode. As described above, in order to drive the piezoelectric vibration module 3 at the reverse rotation vibration mode, the voltage is applied to all the piezoelectric elements 37A, 37B, 37C, 37D, and 37E, so that it is possible to perform switching from the forward rotation vibration mode, in which the voltage is similarly applied to all the piezoelectric elements 37A, 37B, 37C, 37D and 37E, more smoothly and in a stable state.

In contrast, switching from the high speed drive mode to the second low speed drive mode is performed by switching the drive mode of the four piezoelectric vibration modules 3 from the forward rotation vibration mode to the longitudinal vibration mode. As described above, the voltage is applied only to the piezoelectric element 37C in order to drive the piezoelectric vibration module 3 in the longitudinal vibration mode and thus, there is a concern that the vibration state tends to become unstable when switching from the forward rotation vibration mode to the vibration state compared to the third low speed drive mode and for example, the vibration direction of the transmission portion 34 tilts and the rotation speed and torque of the rotor 2 deviated from a design value depending on the drive conditions (magnitude of the drive voltage, frictional force with the rotor 2, and the like). These matters are also similarly applied to the fourth low speed drive mode.

As described above, the low speed drive mode (second drive mode) includes a second low speed drive mode (fifth drive mode) in which the transmission portions 34 of some of the piezoelectric vibration modules 3 rotationally vibrate in the forward direction (first direction) and the transmission portions 34 of others of the piezoelectric vibration modules 3 longitudinally vibrate. With this, the low speed drive mode can be realized by a simpler method.

Here, in the second low speed drive mode, as described above, although the rotor 2 can be rotated at substantially the same rotation speed and torque as those at the third low speed drive mode, the following merits are obtained compared to the third low speed drive mode. That is, in the third low speed drive mode, the piezoelectric vibration module 3 that is not driven in the forward rotation vibration mode is driven in the reverse rotation vibration mode. This reverse rotation vibration mode is a vibration mode in which the transmission portion 34 rotates in the opposite direction to the rotation direction of the rotor 2 (against the rotation of the rotor 2), so that the burden on (wear of) the transmission portion 34 is large. In contrast, in the longitudinal vibration mode, the transmission portion 34 reciprocates in the direction approaching and moving away from the rotor 2 and thus, the burden on (wear of) the transmission portion 34 is small as compared with the reverse rotation vibration mode. For that reason, it is possible to prolong the life of the piezoelectric drive device 1 and it is possible to lengthen a maintenance interval.

As described above, the low speed drive mode (second drive mode) includes the first low speed drive mode (sixth drive mode) in which the transmission portions 34 of some of the piezoelectric vibration modules 3 rotationally vibrate in the forward direction (first direction), the transmission portions 34 of others of the piezoelectric vibration modules 3 longitudinally vibrate, and the number of the piezoelectric vibration modules 3 in which the transmission portions 34 rotationally vibrate in the forward direction is greater than that at the second low speed drive mode (fifth mode). With this, two types of low speed drive modes in which rotation speeds and torques of the rotor 2 are different from each other are obtained. For that reason, operability of the piezoelectric drive device 1 is improved. Also, the low speed drive mode can be realized by a simpler method.

As described above, the low speed drive mode (second drive mode) includes the fourth low speed drive mode (fourth drive mode) in which the transmission portions 34 of some of the piezoelectric vibration modules 3 rotationally vibrate in the forward direction (first direction), the transmission portions 34 of some of the piezoelectric vibration modules 3 rotationally vibrate in the reverse direction (second direction), the transmission portions 34 of others of the piezoelectric vibration modules 3 longitudinally vibrate, and the number of the piezoelectric vibration modules 3 in which the number of the piezoelectric vibration modules 3 rotationally vibrate in the forward direction is greater than the number of the transmission portions 34 rotationally vibrate in the reverse direction. With this, the low speed drive mode can be realized by a simpler method. The fourth low speed drive mode is a compromise between the second low speed drive mode and the third low speed drive mode, and the merit of the second low speed drive mode and the merit of the third low speed drive mode can be exhibited at the fourth low speed drive mode.

As described above, the piezoelectric drive device 1 has a manual mode (seventh drive mode) in which the transmission portions 34 of the plurality of piezoelectric vibration modules 3 longitudinally vibrate to allow movement of the rotor 2. With this, for example, the operator can operate the rotor 2 manually (with his/her own hand), and usability of the piezoelectric drive device 1 is further improved. The manual mode can be suitably used for a case of teaching (storing) the movement of the rotor 2 to the control unit 6 of the piezoelectric drive device 1.

Second Embodiment

Next, a piezoelectric drive device according to a second embodiment of the invention will be described.

Figure 15:
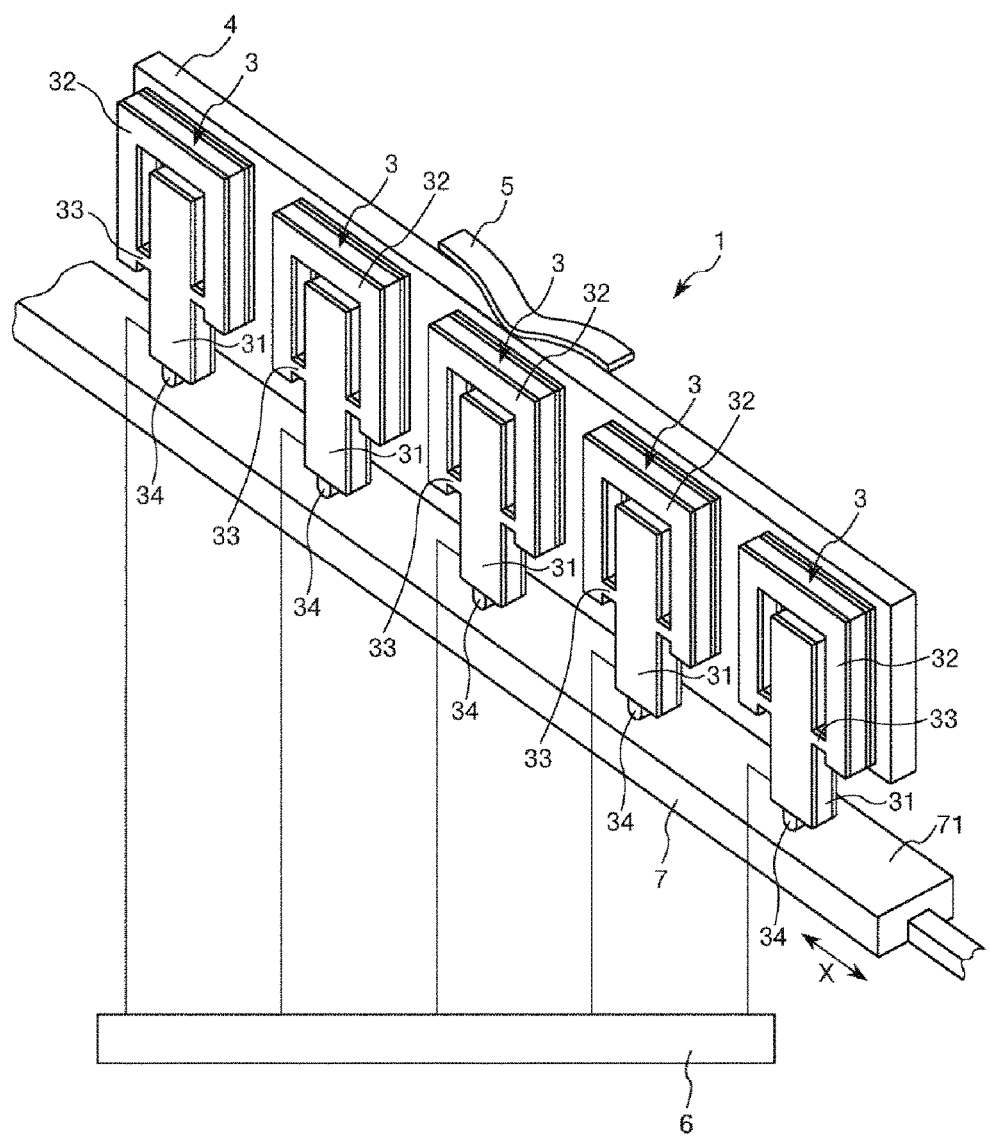
FIG. 15 is a perspective view illustrating a piezoelectric drive device according to a second embodiment of the invention.

FIG. 15 is a perspective view illustrating the piezoelectric drive device according to the second embodiment of the invention.

Hereinafter, the difference between the piezoelectric drive device 1 of the second embodiment and that of the first embodiment described above will be mainly described, and description of similar matters will be omitted.

The piezoelectric drive device according to the second embodiment of the invention is substantially the same as the first embodiment described above except that the configuration of the driven portion is different. The same reference numerals are given to the same configurations as those in the first embodiment described above.

As illustrated in FIG. 15, the piezoelectric drive device 1 of the second embodiment is used as a linear motor, and includes a slider 7 (driven portion) linearly movable along a direction X, a plurality of piezoelectric vibration modules 3 that abut on the upper surface 71 of the slider 7, a stage 4 that supports the plurality of piezoelectric vibration modules 3, an urging portion 5 that urges the piezoelectric vibration module 3 toward the rotor 2 via the stage 4, and a control unit 6 that independently controls driving of each piezoelectric vibration module 3. In such a piezoelectric drive device 1, the moving speed of the slider 7 can be changed by independently controlling (changing) the vibration patterns of the plurality of piezoelectric vibration modules 3.

The slider 7 is in the form of a plate shape and can be reciprocated substantially only in the direction X by a rail (guide member) or the like. However, the configuration of the slider 7 is not particularly limited. The plurality of piezoelectric vibration modules 3 are disposed on the upper surface 71 of the slider 7 by being abutted with the upper surface 71 of the slider 7. The plurality of piezoelectric vibration modules 3 are disposed along the direction X (moving direction of the slider 7).

Also, according to the second embodiment as described above, the same effects as those in the first embodiment described above can be exhibited.

Third Embodiment

Next, a robot according to a third embodiment of the invention will be described.

Figure 16:
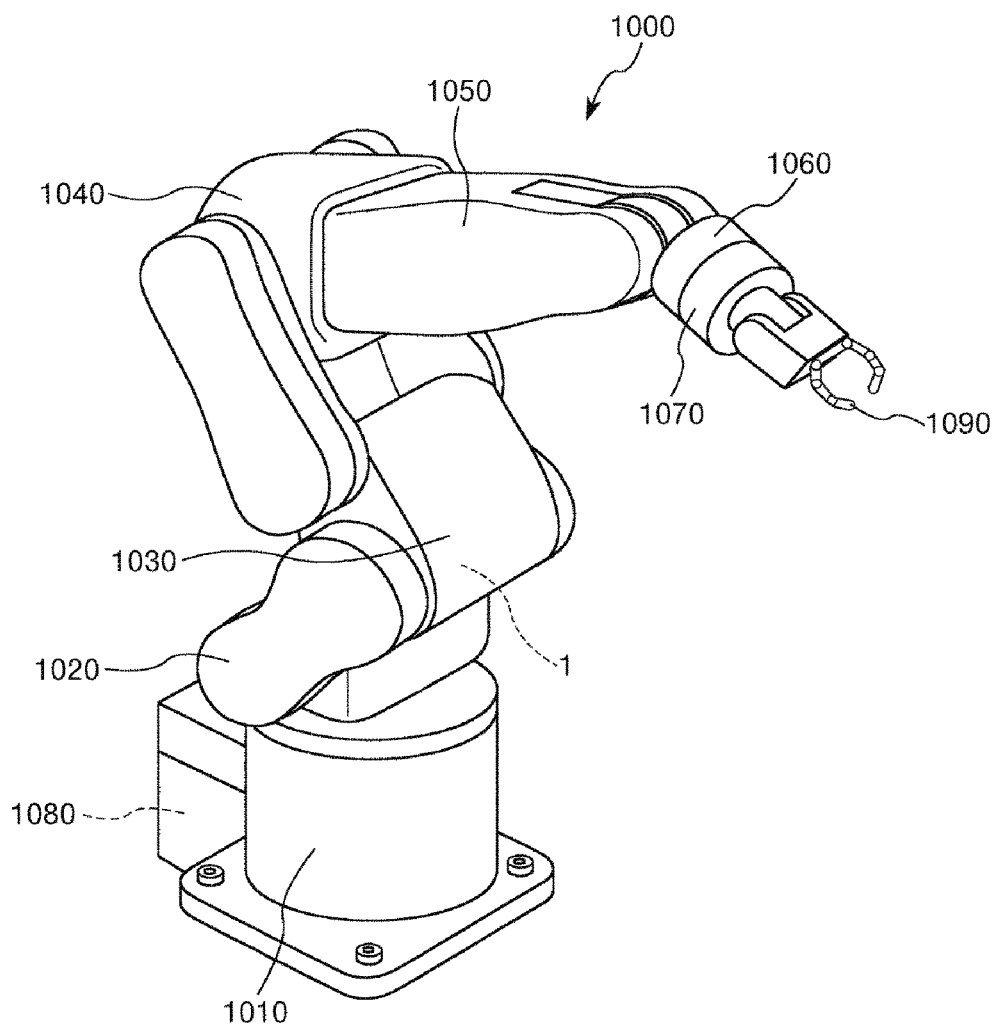
FIG. 16 is a perspective view illustrating a robot according to a third embodiment of the invention.

FIG. 16 is a perspective view illustrating a robot according to the third embodiment of the invention.

A robot 1000 illustrated in FIG. 16 can perform work such as feeding of material, removing of material, transporting of material, and assembling of material for precision equipment and parts constituting the precision equipment. The robot 1000 is a six-shaft robot, and includes a base 1010 fixed to a floor or a ceiling, an arm 1020 rotatably connected to the base 1010, an arm 1030 rotatably connected to the arm 1020, an arm 1040 rotatably connected to the arm 1030, an arm 1050 rotatably connected to the arm 1040, an arm 1060 rotatably connected to the arm 1050, an arm 1070 rotatably connected to the arm 1060, and a robot control unit 1080 for controlling driving of the arms 1020, 1030, 1040, 1050, 1060, and 1070. A hand connection portion is provided on the arm 1070, and an end effector 1090 according to the work to be executed by the robot 1000 is mounted on the hand connection portion. The piezoelectric drive device 1 is mounted on all or some of the respective joint portions, and the arms 1020, 1030, 1040, 1050, 1060, and 1070 are rotated by driving of the piezoelectric drive device 1. Driving of each piezoelectric drive device 1 is controlled by the robot control unit 1080. In addition, the piezoelectric drive device 1 may be mounted on the end effector 1090 and used for driving the end effector 1090.

Such a robot 1000 has the piezoelectric drive device 1. For that reason, it is possible to achieve the effects of the piezoelectric drive device 1 described above and to exhibit high reliability.

Fourth Embodiment

Next, an electronic component transport apparatus according to a fourth embodiment of the invention will be described.

Figure 17:
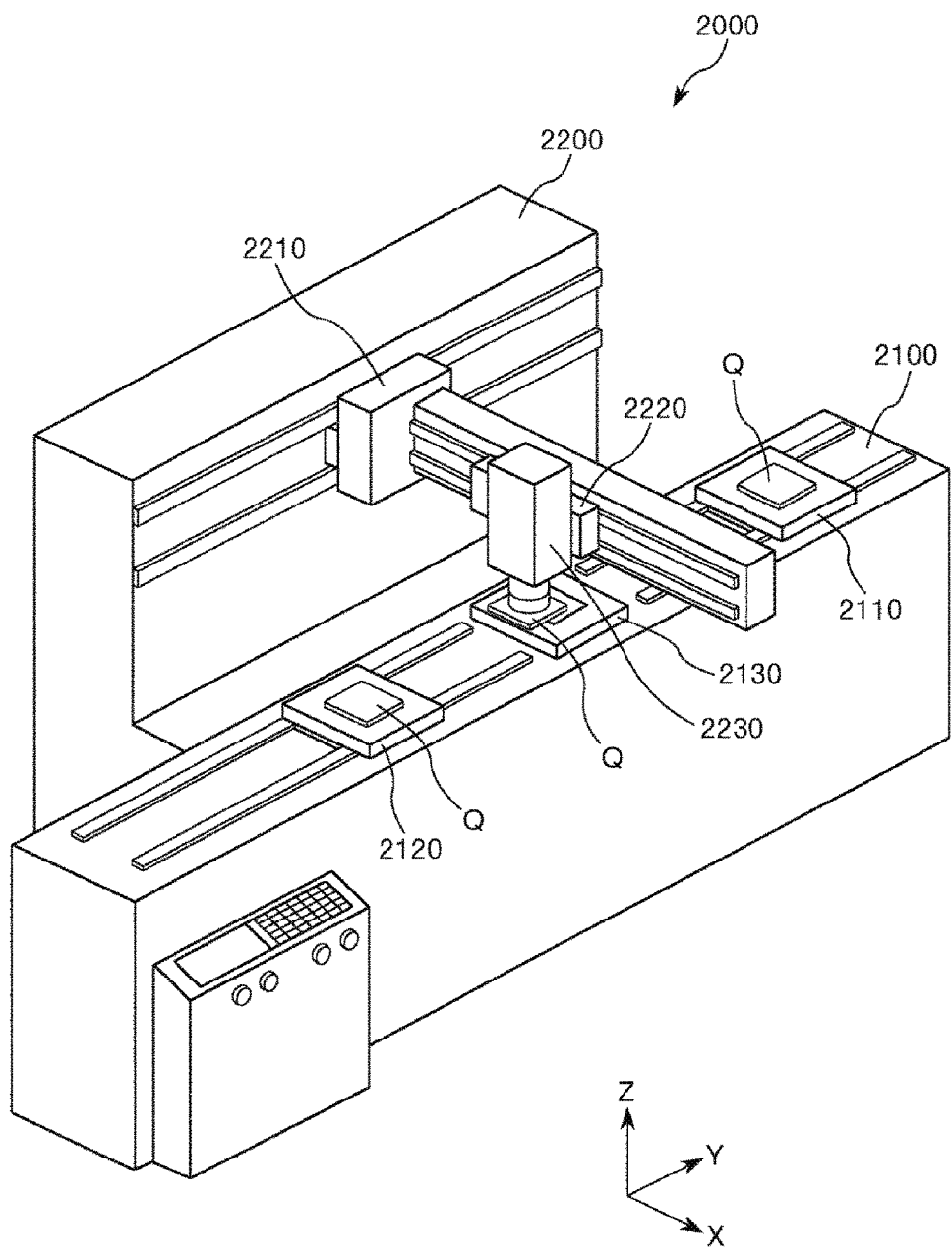
FIG. 17 is a perspective view illustrating an electronic component transport apparatus according to a fourth embodiment of the invention.
Figure 18:
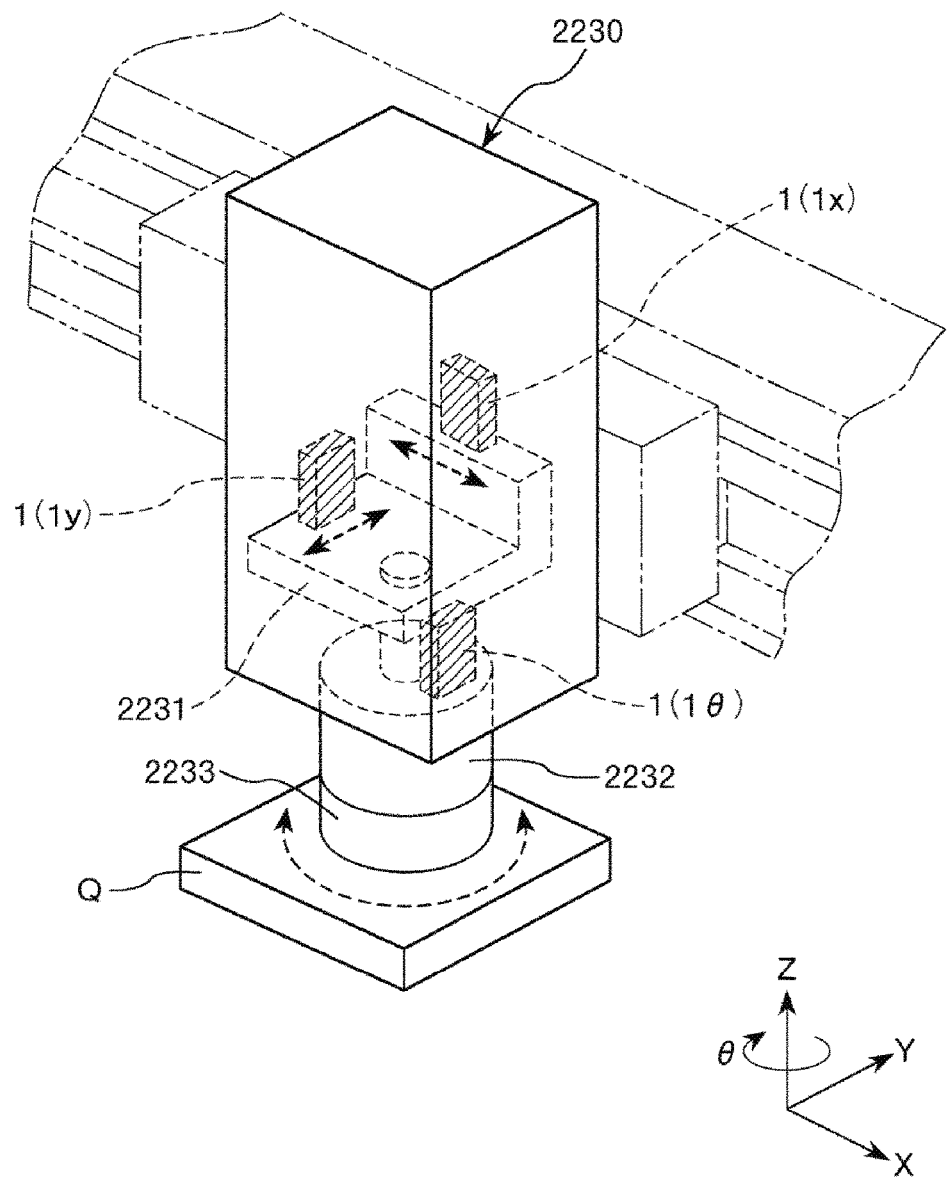
FIG. 18 is a perspective view illustrating an electronic component holding portion included in the electronic component transport apparatus illustrated in FIG. 17.

FIG. 17 is a perspective view illustrating an electronic component transport apparatus according to the fourth embodiment of the invention. FIG. 18 is a perspective view illustrating the electronic component holding portion included in the electronic component transport apparatus illustrated in FIG. 17. In the following description, three axes orthogonal to each other are referred to as an X-axis, a Y-axis, and a Z-axis for convenience of explanation.

An electronic component transport apparatus 2000 illustrated in FIG. 17 is applied to an electronic component inspection apparatus, and includes a base 2100 and a support stand 2200 disposed on a side of the base 2100. Further, on the base 2100, an upstream stage 2110 on which an electronic component Q to be inspected is mounted and transported in the Y-axis direction and a downstream stage 2120 on which an inspected electronic component Q is mounted and transported in the Y-axis direction, and an inspection table 2130 which is positioned between the downstream stage 2120 and the upstream stage 2110 and on which electrical characteristics of the electronic component Q is inspected are provided. Examples of the electronic component Q include a semiconductor, a semiconductor wafer, a display device such as a CLD and an OLED, a quartz crystal device, various sensors, an ink jet head, various MEMS devices, and the like.

A Y-stage 2210 movable in the Y axis direction with respect to the support stand 2200 is provided on the support stand 2200, an X-stage 2220 movable in the X-axis direction with respect to the Y-stage 2210 provided on the Y-stage 2210, and an electronic component holding portion 2230 movable in the Z-axis direction with respect to the X-stage 2220 is provided on the X-stage 2220.

As illustrate in FIG. 18, the electronic component holding portion 2230 includes a fine adjustment plate 2231 movable in the X axis direction and the Y axis direction, and a rotation portion 2232 rotatable about the Z-axis with respect to the fine adjustment plate 2231, and a holding portion 2233 which is provided in the rotating portion 2232 and holds the electronic component Q. The electronic component holding portion 2230 is provided with the piezoelectric drive device 1 (1x) for moving the fine adjustment plate 2231 in the X-axis direction, the piezoelectric drive device 1 (1y) for moving the fine adjustment plate 2231 in the Y-axis direction, and the piezoelectric drive device 1 (1θ) for rotating the rotating portion 2232 around the Z-axis. As the piezoelectric drive devices 1x and 1y, for example, those of the second embodiment described above can be used and as the piezoelectric drive device 1θ described above, that of the first embodiment can be used.

Such an electronic component transport apparatus 2000 includes the piezoelectric drive device 1. For that reason, it is possible to achieve the effects of the piezoelectric drive device 1 described above and to exhibit high reliability.

Fifth Embodiment

Next, a printer according to a fifth embodiment of the invention will be described.

Figure 19:
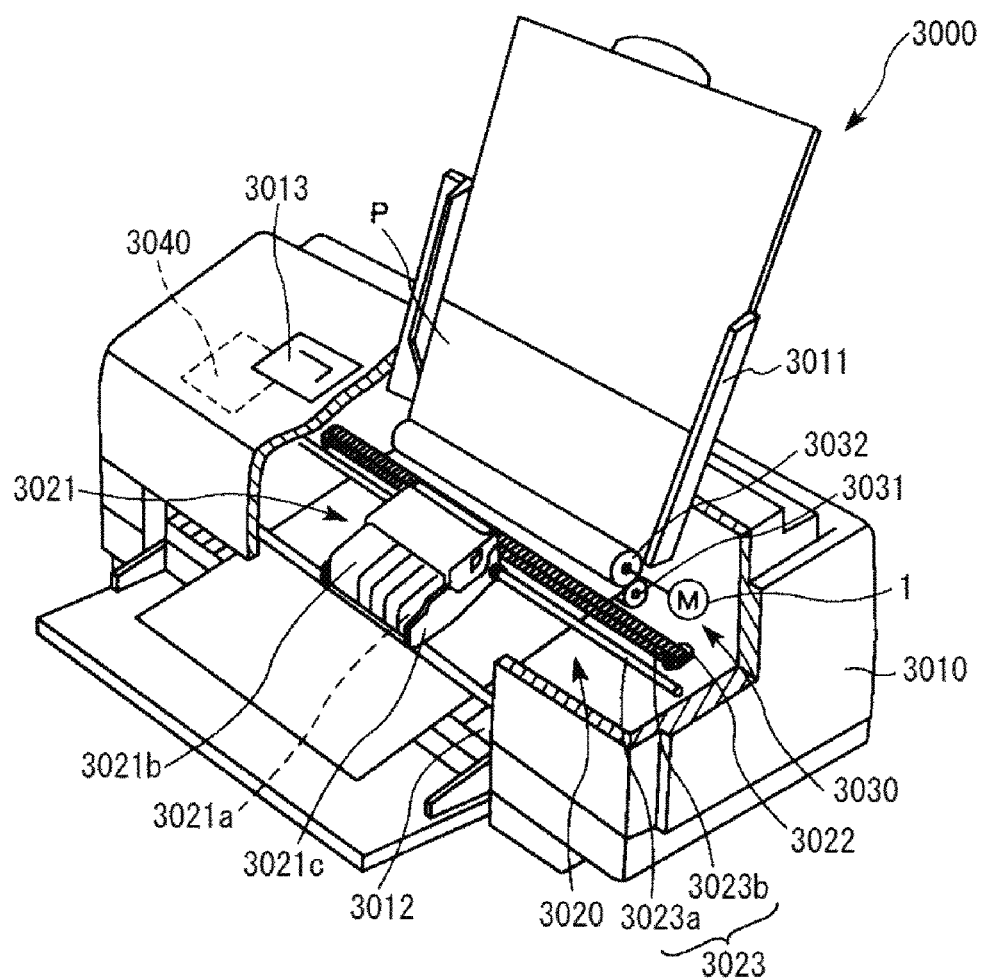
FIG. 19 is a schematic diagram illustrating an overall configuration of a printer according to a fifth embodiment of the invention.

FIG. 19 is a schematic diagram illustrating the overall configuration of a printer according to a fifth embodiment of the invention.

A printer 3000 illustrated in FIG. 19 includes an apparatus main body 3010, a printing mechanism 3020 provided inside the apparatus main body 3010, a sheet feed mechanism 3030, and a control unit 3040. The apparatus main body 3010 is provided with a tray 3011 for placing a recording sheet P, a sheet discharge port 3012 for discharging the recording sheet P, and an operation panel 3013 such as a liquid crystal display.

The printing mechanism 3020 includes a head unit 3021, a carriage motor 3022, and a reciprocating mechanism 3023 for reciprocating the head unit 3021 by a drive force of the carriage motor 3022. The head unit 3021 includes a head 3021a which is an ink jet type recording head, an ink cartridge 3021b which supplies ink to the head 3021a, and a carriage 3021c on which the head 3021a and the ink cartridge 3021b are mounted.

The reciprocating mechanism 3023 includes a carriage guide shaft 3023a which reciprocatably supports the carriage 3021c and a timing belt 3023b for moving the carriage 3021c on the carriage guide shaft 3023a with the drive force of the carriage motor 3022.

The sheet feed mechanism 3030 includes a driven roller 3031 and a driving roller 3032 that are in pressure contact with each other and a piezoelectric drive device 1 that is a sheet feed motor that drives the driving roller 3032.

The control unit 3040 controls the printing mechanism 3020, the sheet feed mechanism 3030, and the like based on print data input from a host computer such as a personal computer.

In such a printer 3000, the sheet feed mechanism 3030 intermittently feeds the recording sheet P one by one to the vicinity of the lower portion of the head unit 3021. At this time, the head unit 3021 reciprocates in a direction substantially orthogonal to the feed direction of the recording sheet P and printing on the recording sheet P is performed.

Such a printer 3000 includes the piezoelectric drive device 1. For that reason, it is possible to achieve the effects of the piezoelectric drive device 1 described above and to exhibit high reliability. In the fifth embodiment, the piezoelectric drive device 1 drives the sheet feed driving roller 3032, but in addition to this, for example, may also drive the carriage 3021c.

Sixth Embodiment

Next, a projector according to a sixth embodiment of the invention will be described.

Figure 20:
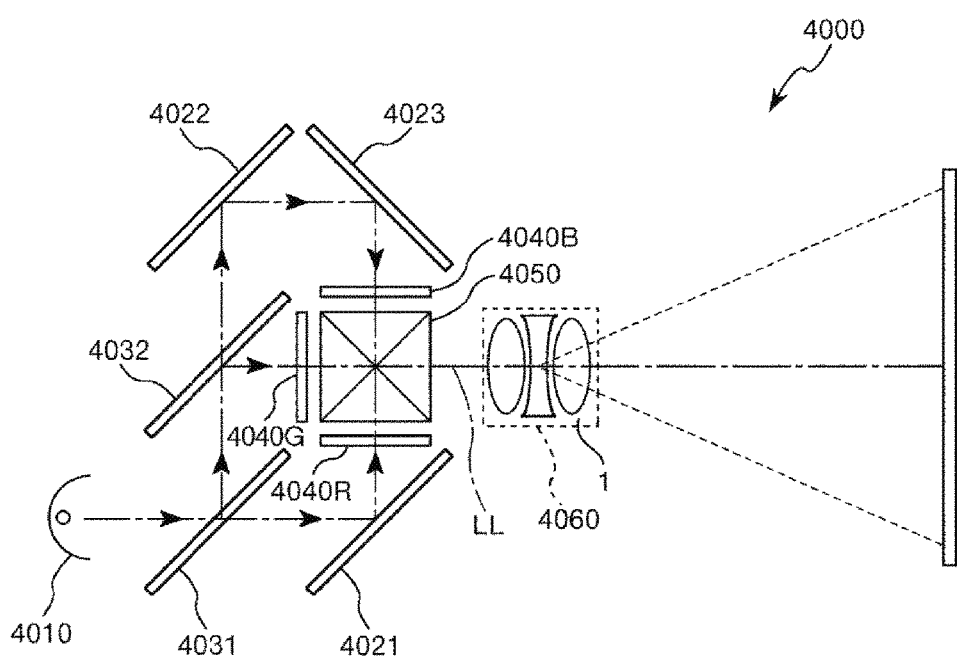
FIG. 20 is a schematic diagram illustrating an overall configuration of a projector according to a sixth embodiment of the invention.

FIG. 20 is a schematic diagram illustrating the overall configuration of a projector according to the sixth embodiment of the invention.

A projector 4000 illustrated in FIG. 20 is an LCD type projector and includes a light source 4010, mirrors 4021, 4022, and 4023, dichroic mirrors 4031 and 4032, liquid crystal display elements 4040R, 4040G, 4040B, a dichroic prism 4050, a projection lens system 4060, and the piezoelectric drive device 1.

As the light source 4010, for example, a halogen lamp, a mercury lamp, a light emitting diode (LED), and the like are included. As the light source 4010, one that emits white light is used. Then, light emitted from the light source 4010 is first separated into red light (R) and other light beams by the dichroic mirror 4031. After being reflected by the mirror 4021, red light enters the liquid crystal display element 4040R, and the other light beams are further separated into green light (G) and blue light (B) by the dichroic mirror 4032. Then, green light (G) enters the liquid crystal display element 4040G and blue light (B) is reflected by the mirrors 4022 and 4023 and then enters the liquid crystal display element 4040B.

Each of the liquid crystal display elements 4040R, 4040G, 4040B is used as a spatial light modulator. These liquid crystal display elements 4040R, 4040G, and 4040B are transmissive spatial light modulators corresponding to primary colors of R, G, and B, respectively, and have pixels arrayed in a matrix of, for example, 1080 rows in the vertical direction and 1920 columns in the horizontal direction. In each pixel, an amount of transmitted light with respect to incident light is adjusted, and light amount distribution of all the pixels is cooperatively controlled in each of the liquid crystal display elements 4040R, 4040G, and 4040B. Light beams spatially modulated by the liquid crystal display elements 4040R, 4040G, and 4040B are synthesized in the dichroic prism 4050, and full color image light LL is emitted from the dichroic prism 4050. Then, the emitted projected image light LL is enlarged and projected onto, for example, a screen or the like, by the projection lens system 4060. The piezoelectric drive device 1 can change a focal length by moving at least one lens included in the projection lens system 4060 in an optical axis direction.

Such a projector 4000 includes the piezoelectric drive device 1. For that reason, it is possible to achieve the effects of the piezoelectric drive device 1 described above and to exhibit high reliability.

Although the piezoelectric drive device, the drive method of the piezoelectric drive device, the robot, the electronic component transport apparatus, the printer, and the projector according to the invention have been described based on the illustrated embodiments, the invention is not limited thereto and the configuration of each of the portions and units can be remounted with any configuration having the same function. Further, any other component may be added to the invention. Embodiments described above may be appropriately combined.

In the embodiments described above, although the configurations in which the piezoelectric drive device is applied to the robot, the electronic component transport apparatus, the printer, and the projector are described, the piezoelectric drive device can also be applied to various electronic devices other than those described above.

The entire disclosure of Japanese Patent Application No. 2017-070931, filed Mar. 31, 2017 is expressly incorporated by reference herein.

What is claimed is:

1. A piezoelectric drive device comprising:
   a plurality of piezoelectric vibration modules each of which including a vibration portion and a transmission portion which abuts on a driven portion and transmits longitudinal vibration in an alignment direction in which the vibration portion is aligned with the driven portion and bending vibration which is a composite vibration of the longitudinal vibration and lateral vibration of the vibration portion in a direction intersecting the alignment direction to the driven portion; and a control unit that controls the plurality of piezoelectric vibration modules, wherein the control unit controls the plurality of piezoelectric vibration modules in a drive mode which includes a first drive mode in which the transmission portions of all the plurality of piezoelectric vibration modules are driven so as to perform the bending vibration in a first direction, and a second drive mode in which the transmission portions of some of the plurality of piezoelectric vibration modules are driven so as to perform the bending vibration in the first direction and the transmission portions of others of the plurality of the piezoelectric vibration modules are driven so as to perform the longitudinal vibration or the bending vibration in a second direction opposite to the first direction.

2. The piezoelectric drive device according to claim 1, wherein the control unit controls the plurality of piezoelectric vibration modules in the drive mode which includes a third drive mode in which the transmission portions of some of the piezoelectric vibration modules are driven so as to perform the bending vibration in the first direction, the transmission portions of others of the piezoelectric vibration modules are driven so as to perform the bending vibration in the second direction, and the number of the piezoelectric vibration modules in which the transmission portions perform the bending vibration in the first direction is greater than the number of the piezoelectric vibration modules in which the transmission portions perform the bending vibration in the second direction.

3. The piezoelectric drive device according to claim 1, wherein the control unit controls the plurality of piezoelectric vibration modules in the drive mode which includes a fourth drive mode in which the transmission portions of some of the piezoelectric vibration modules are driven so as to perform the bending vibration in the first direction, the transmission portions of others of the piezoelectric vibration modules are driven so as to perform the bending vibration in the second direction or the longitudinal vibration, and the number of the piezoelectric vibration modules in which the transmission portions perform the bending vibration in the first direction is greater than the number of the piezoelectric vibration modules in which the transmission portions perform the bending vibration in the second direction.

4. The piezoelectric drive device according to claim 1, wherein the control unit controls the plurality of piezoelectric vibration modules in the drive mode which includes a fifth drive mode in which the transmission portions of some of the piezoelectric vibration modules are driven so as to perform the bending vibration in the first direction and the transmission portions of others of the piezoelectric vibration modules are driven so as to perform the longitudinal vibration.

5. The piezoelectric drive device according claim 4, wherein the control unit includes a sixth drive mode in which the transmission portions of some of the piezoelectric vibration modules are driven so as to perform the bending vibration in the first direction, the transmission portions of others of the piezoelectric vibration modules are driven so as to perform the longitudinal vibration, and the number of the piezoelectric vibration modules in which the transmission portions perform the bending vibration in the first direction is greater than the number of those at the fifth drive mode.

6. The piezoelectric drive device according to claim 1, wherein the control unit includes a seventh drive mode in which movement of the driven portions is allowed by causing the transmission portions of the plurality of piezoelectric vibration modules to be driven to perform the longitudinal vibration.

7. A robot comprising:
the piezoelectric drive device according to claim 1.

8. A robot comprising:
the piezoelectric drive device according to claim 2.

9. A robot comprising:
the piezoelectric drive device according to claim 3.

10. An electronic component transport apparatus comprising:
the piezoelectric drive device according to claim 1.

11. An electronic component transport apparatus comprising:
the piezoelectric drive device according to claim 2.

12. An electronic component transport apparatus comprising:
the piezoelectric drive device according to claim 3.

13. A printer comprising:
the piezoelectric drive device according to claim 1.

14. A printer comprising:
the piezoelectric drive device according to claim 2.

15. A printer comprising:
the piezoelectric drive device according to claim 3.

16. A projector comprising:
the piezoelectric drive device according to claim 1.

17. A projector comprising:
the piezoelectric drive device according to claim 2.

18. A projector comprising:
the piezoelectric drive device according to claim 3.

19. A drive method of a piezoelectric drive device which includes a plurality of piezoelectric vibration modules each of which including a vibration portion and a transmission portion which abuts on a driven portion and transmits longitudinal vibration in an alignment direction in which the vibration portion is aligned with the driven portion and bending vibration which is a composite vibration of the longitudinal vibration and lateral vibration of the vibration portion in a direction intersecting the alignment direction to the driven portion, and the drive method comprising:

setting a first drive mode in which the transmission portions of the plurality of piezoelectric vibration modules are caused to perform the bending vibration in a first direction and a second drive mode in which the transmission portions of some of the piezoelectric vibration modules are caused to perform the bending vibration in the first direction and the transmission portions of others of the piezoelectric vibration modules are caused to perform the longitudinal vibration or the bending vibration in a second direction opposite to the first direction; and selecting and executing one of the first drive mode and the second drive mode.

20. A piezoelectric drive device that drives a plurality of piezoelectric vibration modules each of which including a vibration portion and a transmission portion which abuts on a driven portion and transmits longitudinal vibration in an alignment direction in which the vibration portion is aligned with the driven portion and bending vibration which is a composite vibration of the longitudinal vibration and lateral vibration of the vibration portion in a direction intersecting the alignment direction to the driven portion, wherein the plurality of piezoelectric vibration modules are controlled in a drive mode which includes a first drive mode in which the transmission portions of all the plurality of piezoelectric vibration modules are driven so as to perform the bending vibration in a first direction, and a second drive mode in which the transmission portions of some of the plurality of piezoelectric vibration modules are driven so as to perform the bending vibration in the first direction and the transmission portions of others of the plurality of the piezoelectric vibration modules are driven so as to perform the longitudinal vibration or the bending vibration in a second direction opposite to the first direction.

\* \* \* \* \*